(12) United States Patent
Krosschell et al.

(10) Patent No.: US 12,708,918 B2
(45) Date of Patent: Aug. 18, 2026

(54) VALVE CONTROL SYSTEMS AND METHODS

(71) Applicant: Raven Industries, Inc., Sioux Falls, SD (US)

(72) Inventors: Justin Krosschell, Sioux Falls, SD (US); Travis Allen Burgers, Sioux Falls, SD (US); Drew John Waltner, Freeman, SD (US); Jared Ernest Kocer, Sioux Falls, SD (US); John D. Preheim, Beresford, SD (US)

(73) Assignee: Raven Industries, Inc., Sioux Falls, SD (US)

( * ) Notice: Subject to any disclaimer, the term of this patent is extended or adjusted under 35 U.S.C. 154(b) by 357 days.

(21) Appl. No.: 18/140,491

(22) Filed: Apr. 27, 2023

(65) Prior Publication Data

US 2023/0356248 A1 Nov. 9, 2023

Related U.S. Application Data

(60) Provisional application No. 63/337,899, filed on May 3, 2022.

(51) Int. Cl.
*B05B 12/02* (2006.01)
*A01C 23/04* (2006.01)
*A01M 7/00* (2006.01)

(52) U.S. Cl.
CPC ............ *B05B 12/02* (2013.01); *A01C 23/047* (2013.01); *A01M 7/0089* (2013.01)

(58) Field of Classification Search
None
See application file for complete search history.

(56) References Cited

U.S. PATENT DOCUMENTS 1,582,986 A * 5/1926 Percival .................. H01F 7/081 335/279
1,947,407 A 2/1934 Cornell, Jr.
(Continued)

FOREIGN PATENT DOCUMENTS

AU 725448 10/2000
AU 2004219715 9/2004
(Continued)

OTHER PUBLICATIONS

"International Application Serial No. PCT US2022 048981, International Preliminary Report on Patentability mailed May 16, 2024", 20 pgs.

(Continued)

*Primary Examiner* — Jason Lin
(74) *Attorney, Agent, or Firm* — Schwegman Lundberg & Woessner, P.A.

(57) ABSTRACT

Sprayer control systems and methods for applying an agricultural product are provided. A system can include a plurality of smart nozzles for mounting along a boom. Each of the smart nozzles can include an electronic control unit (ECU), a control valve, and one or more spray nozzles. The system can further include a master node in communication with the ECUs. The master node and ECUs can include a processing system for regulating the supply of agricultural product to the plurality of smart nozzles. The processing system can include at least one dynamic actuation timing module configured to receive a plurality of valve control inputs for a respective control valve of a respective smart nozzle associated with the ECU and dynamically determine an actuation time for the respective control valve based on the plurality of valve control inputs.

36 Claims, 12 Drawing Sheets

(56) References Cited

U.S. PATENT DOCUMENTS 3,197,299 A * 7/1965 Emerson .................. B64D 1/18 504/319
3,770,198 A 11/1973 Mihara
3,955,795 A 5/1976 Neely
4,283,010 A 8/1981 Arzi et al.
4,392,611 A 7/1983 Bachman et al.
4,398,605 A 8/1983 Conklin et al.
4,530,463 A 7/1985 Hiniker et al.
4,582,085 A 4/1986 Hafner et al.
4,632,358 A 12/1986 Orth et al.
4,803,626 A 2/1989 Bachman et al.
4,970,973 A 11/1990 Lyle et al.
5,134,961 A 8/1992 Giles et al.
5,285,814 A 2/1994 Pettersson et al.
5,310,113 A 5/1994 Cowgur
5,337,959 A 8/1994 Boyd
5,475,614 A 12/1995 Tofte et al.
5,479,812 A 1/1996 Juntunen et al.
5,496,100 A 3/1996 Schmid
5,503,366 A 4/1996 Zabeck et al.
5,520,333 A 5/1996 Tofte
5,615,836 A 4/1997 Graef
5,635,911 A 6/1997 Landers et al.
5,649,687 A 7/1997 Rosas et al.
5,653,389 A 8/1997 Henderson et al.
5,703,554 A 12/1997 Polgar et al.
5,704,546 A 1/1998 Henderson et al.
5,772,114 A 6/1998 Hunter
5,785,246 A 7/1998 King et al.
5,801,948 A 9/1998 Wood et al.
5,864,781 A 1/1999 White
5,881,919 A 3/1999 Womac et al.
5,883,383 A 3/1999 Dragne
5,884,205 A 3/1999 Elmore et al.
5,884,224 A 3/1999 McNabb et al.
5,897,600 A 4/1999 Elmore et al.
5,911,362 A 6/1999 Wood et al.
5,913,915 A 6/1999 McQuinn
5,919,242 A 7/1999 Greatline et al.
5,924,371 A 7/1999 Flamme et al.
5,931,882 A 8/1999 Fick et al.
5,936,234 A 8/1999 Thomas et al.
5,938,071 A 8/1999 Sauder
5,941,303 A 8/1999 Gowan et al.
5,967,066 A 10/1999 Giles et al.
5,969,340 A 10/1999 Dragne et al.
5,971,294 A 10/1999 Thompson et al.
5,978,723 A 11/1999 Hale et al.
6,009,354 A 12/1999 Flamme et al.
6,012,996 A 1/2000 Lo
6,029,907 A 2/2000 McKenzie
6,070,538 A 6/2000 Flamme et al.
6,070,539 A 6/2000 Flamme et al.
6,079,340 A 6/2000 Flamme et al.
6,086,042 A 7/2000 Scott et al.
6,089,743 A 7/2000 Mcquinn et al.
6,093,926 A 7/2000 Mertins et al.
6,112,999 A 9/2000 Fingleton et al.
6,122,581 A 9/2000 McQuinn
6,145,455 A 11/2000 Gust et al.
6,149,071 A 11/2000 Maccallummhor et al.
6,189,466 B1 2/2001 Sinclair et al.
6,189,807 B1 2/2001 Miller et al.
6,196,473 B1 3/2001 Beeren et al.
6,199,000 B1 3/2001 Keller et al.
6,209,563 B1 4/2001 Seid et al.
6,216,614 B1 4/2001 Wollenhaupt
6,230,091 B1 5/2001 McQuinn et al.
6,236,924 B1 5/2001 Motz et al.
6,240,861 B1 6/2001 Memory
6,250,564 B1 6/2001 Chahley
6,269,757 B1 8/2001 Kiest
6,276,385 B1 8/2001 Gassman
6,285,938 B1 9/2001 Lang et al.
6,305,583 B1 10/2001 Ward et al.
6,373,057 B1 4/2002 Penfold
6,486,761 B1 11/2002 Czarnetzki et al.
6,522,948 B1 2/2003 Benneweis
6,533,334 B1 3/2003 Bonn
6,584,920 B1 7/2003 Cresswell
6,598,944 B1 7/2003 Wolff et al.
6,606,542 B2 8/2003 Hauwiller et al.
6,661,514 B1 12/2003 Tevs et al.
6,666,384 B2 12/2003 Prandi
6,678,580 B2 1/2004 Benneweis
6,698,368 B2 3/2004 Cresswell
6,708,080 B2 3/2004 Benneweis
6,720,684 B2 4/2004 Czimmek
6,755,390 B2 6/2004 Masuda et al.
6,776,355 B2 8/2004 Ringer et al.
6,851,377 B2 2/2005 Mayerle et al.
6,853,276 B2 2/2005 Smith
6,877,675 B2 4/2005 Benneweis
6,877,717 B2 4/2005 Collins et al.
6,959,907 B2 11/2005 Hironaka
6,994,406 B1 2/2006 Krawczyk et al.
7,124,964 B2 10/2006 Bui
7,147,241 B2 12/2006 Beaujot et al.
7,152,540 B1 12/2006 Sauder et al.
7,156,322 B1 1/2007 Heitzman et al.
7,162,961 B2 1/2007 Grimm
7,195,027 B2 3/2007 Goossens et al.
7,243,899 B2 7/2007 Acar et al.
7,248,211 B2 * 7/2007 Hatch ..................... G01S 19/41 342/357.31
7,311,004 B2 12/2007 Giles
7,347,221 B2 3/2008 Berger et al.
7,395,769 B2 7/2008 Jensen
7,400,956 B1 * 7/2008 Feller ...................... G01S 19/53 701/470
7,441,746 B2 10/2008 Sugiyama
7,472,660 B2 1/2009 Mariman et al.
7,478,603 B2 1/2009 Riewerts et al.
7,490,564 B2 2/2009 Allan et al.
7,502,665 B2 3/2009 Giles et al.
7,626,288 B2 12/2009 Protze
7,654,473 B2 2/2010 Hibberd
7,685,951 B2 3/2010 Beaujot et al.
7,690,440 B2 4/2010 Dean et al.
7,694,638 B1 4/2010 Riewerts et al.
7,706,926 B2 4/2010 Peterson
7,742,842 B2 6/2010 Giles et al.
7,789,321 B2 9/2010 Hitt
7,826,930 B2 11/2010 Giles et al.
7,845,914 B2 12/2010 Engelbrecht et al.
7,848,865 B2 12/2010 Di Federico et al.
7,917,249 B2 3/2011 Jacobsen et al.
7,954,731 B2 6/2011 Antonucci et al.
8,078,367 B2 12/2011 Sauder et al.
8,109,448 B2 2/2012 Giles
8,141,504 B2 3/2012 Dean et al.
8,170,825 B2 5/2012 Beaujot et al.
8,186,288 B2 5/2012 Chinkiwsky
8,191,795 B2 6/2012 Grimm et al.
8,191,798 B2 6/2012 Hahn et al.
8,196,534 B2 6/2012 Meyer et al.
8,214,111 B2 7/2012 Heiniger et al.
8,246,004 B2 8/2012 Kratzer
8,401,704 B2 3/2013 Pollock et al.
8,488,874 B2 7/2013 Zaman et al.
8,505,573 B2 8/2013 Herbert et al.
8,523,085 B2 9/2013 Grimm et al.
8,590,859 B2 11/2013 Kurz
8,634,993 B2 1/2014 McClure
8,635,963 B2 1/2014 Friggstad
8,701,707 B2 4/2014 Moosmann et al.
8,733,257 B2 5/2014 Beaujot et al.
8,733,259 B2 5/2014 Beaujot
8,739,830 B2 6/2014 Bradbury et al.
8,825,310 B2 9/2014 Kowalchuk
8,844,838 B2 9/2014 Funseth et al.
8,868,300 B2 10/2014 Kocer et al.
8,915,200 B2 12/2014 Barsi et al.
8,919,676 B2 12/2014 Funseth et al.

(56) References Cited

U.S. PATENT DOCUMENTS 9,052,031 B2 6/2015 Leidig
9,061,296 B2 6/2015 Peterson
9,073,070 B2 7/2015 Funseth et al.
9,080,684 B2 7/2015 Stahr
9,113,591 B2 8/2015 Shivak
9,144,190 B2 9/2015 Henry et al.
9,266,124 B2 2/2016 Humpal
9,453,585 B2 9/2016 Sato et al.
9,470,332 B2 10/2016 Miura
9,504,212 B2 11/2016 Michael et al.
9,506,578 B2 11/2016 Lee
9,635,848 B2 5/2017 Needham et al.
9,702,475 B2 7/2017 Scheffel et al.
9,781,916 B2 10/2017 Preheim et al.
9,894,829 B2 2/2018 Shivak
10,058,879 B2 8/2018 Needham
10,173,236 B2 1/2019 Preheim et al.
10,189,031 B2 1/2019 Funseth et al.
10,368,538 B2 8/2019 Preheim et al.
10,518,284 B2 12/2019 Thurow et al.
10,568,257 B2 2/2020 Shivak
10,799,898 B2 10/2020 Posselius et al.
10,821,460 B2 11/2020 Batcheller et al.
11,051,505 B2 7/2021 Humpal et al.
11,071,247 B2 7/2021 Shivak et al.
11,134,668 B2 10/2021 Preheim et al.
11,160,204 B2 11/2021 Michael
11,236,841 B2 2/2022 Krosschell et al.
11,261,998 B2 3/2022 Bodenschatz et al.
11,309,112 B2 4/2022 Katagiri et al.
11,396,892 B2 * 7/2022 Long .................. A01M 7/0071
11,612,160 B2 3/2023 Krosschell et al.
11,944,046 B2 4/2024 Wonderlich et al.
12,274,260 B2 * 4/2025 Long .................. A01C 23/007
12,449,061 B2 10/2025 Krosschell et al.
12,458,012 B2 11/2025 Krosschell et al.
2002/0030119 A1 3/2002 Proharam
2002/0107609 A1 8/2002 Benneweis
2003/0028321 A1 2/2003 Upadhyaya et al.
2003/0070597 A1 4/2003 Cresswell
2003/0234301 A1 12/2003 Swan
2004/0036048 A1 2/2004 Petersen
2004/0104370 A1 6/2004 Suzuki
2004/0128045 A1 7/2004 Benneweis
2005/0000277 A1 1/2005 Giles
2005/0048196 A1 3/2005 Yanagita et al.
2005/0051749 A1 3/2005 Lee
2005/0076818 A1 4/2005 Grimm
2005/0092951 A1 * 5/2005 Groetzinger ........ F16K 31/0658 251/129.15
2005/0125083 A1 6/2005 Kiko
2005/0173979 A1 8/2005 Voss
2006/0086295 A1 4/2006 Jensen
2006/0097210 A1 5/2006 Fong et al.
2006/0237562 A1 10/2006 Hedegard
2006/0265106 A1 11/2006 Giles et al.
2006/0273189 A1 * 12/2006 Grimm .................. A01G 25/16 239/146
2007/0039880 A1 2/2007 Mayerle
2008/0110476 A1 5/2008 Amestoy et al.
2008/0114497 A1 5/2008 Giles et al.
2008/0114498 A1 5/2008 Giles
2008/0147282 A1 6/2008 Kormann
2008/0163807 A1 7/2008 Dean et al.
2008/0230624 A1 9/2008 Giles et al.
2008/0283633 A1 11/2008 Nozaki et al.
2008/0296398 A1 * 12/2008 Hickman ............. B05B 1/1654 239/8
2009/0078178 A1 3/2009 Beaujot
2009/0101371 A1 4/2009 Melanson et al.
2009/0112372 A1 * 4/2009 Peterson ............ A01M 7/0089 700/283
2009/0114210 A1 5/2009 Guice et al.
2009/0134237 A1 5/2009 Giles
2009/0184182 A1 7/2009 Beeren
2009/0271136 A1 10/2009 Beaujot et al.
2010/0032492 A1 2/2010 Grimm et al.
2010/0096476 A1 4/2010 Callies et al.
2010/0101469 A1 4/2010 Landphair et al.
2010/0132600 A1 6/2010 Dean et al.
2010/0163774 A1 7/2010 Rimboym et al.
2010/0269921 A1 * 10/2010 Pifer .................... G05D 7/0676 137/511
2011/0054743 A1 * 3/2011 Kocer ...................... A01C 7/06 701/50
2011/0160920 A1 * 6/2011 Orr ...................... A01C 23/047 700/283
2011/0179984 A1 7/2011 Beaujot et al.
2011/0204272 A1 8/2011 Kratzer
2011/0210186 A1 9/2011 Kugler et al.
2012/0045013 A1 2/2012 Chen et al.
2012/0080624 A1 4/2012 Stahr et al.
2012/0153051 A1 6/2012 Kah, Jr. et al.
2012/0168530 A1 7/2012 Ellingson et al.
2012/0169495 A1 * 7/2012 Kowalchuk ............ A01C 7/203 111/171
2012/0174843 A1 7/2012 Friggstad
2012/0195496 A1 8/2012 Zaman et al.
2012/0211508 A1 8/2012 Barsi et al.
2012/0216732 A1 8/2012 Ballard et al.
2012/0228395 A1 9/2012 Needham
2012/0241533 A1 9/2012 Moeller et al.
2012/0271467 A1 10/2012 Grimm et al.
2013/0032737 A1 * 2/2013 Neilson ............. G05D 16/2024 251/129.01
2013/0037633 A1 2/2013 Walter et al.
2013/0092746 A1 * 4/2013 Scott ................. B23Q 11/1076 137/315.01
2013/0119154 A1 5/2013 Sawyer
2013/0192503 A1 8/2013 Henry et al.
2013/0269578 A1 10/2013 Grimm
2013/0292590 A1 * 11/2013 Stahr ....................... B60T 8/363 251/337
2013/0306894 A1 11/2013 Weis et al.
2013/0320105 A1 12/2013 Schmidt
2013/0320106 A1 12/2013 Schmidt
2013/0333601 A1 12/2013 Shivak
2014/0014863 A1 * 1/2014 Najmolhoda ....... F16K 11/0716 310/14
2014/0026995 A1 * 1/2014 Mayr ...................... F16K 47/12 137/637
2014/0048002 A1 2/2014 Grimm et al.
2014/0084196 A1 3/2014 Heyer et al.
2014/0091243 A1 4/2014 Leidig
2014/0216315 A1 8/2014 Beaujot et al.
2014/0252111 A1 9/2014 Michael et al.
2014/0263705 A1 9/2014 Michael et al.
2014/0263708 A1 9/2014 Thompson et al.
2014/0263709 A1 9/2014 Kocer et al.
2014/0277780 A1 9/2014 Jensen et al.
2014/0299673 A1 10/2014 Grimm et al.
2014/0312141 A1 10/2014 Ravishankar
2014/0333398 A1 11/2014 Nila et al.
2014/0361094 A1 12/2014 Michael
2015/0115058 A1 4/2015 Wilger
2015/0167861 A1 6/2015 Ferrer Herrera et al.
2015/0257331 A1 9/2015 Shivak
2015/0336116 A1 11/2015 Gerdes
2015/0367352 A1 12/2015 Burchardt
2015/0367357 A1 12/2015 Humpal et al.
2015/0367358 A1 12/2015 Funseth et al.
2015/0375247 A1 * 12/2015 Funseth .................... B05B 1/20 239/69
2016/0015020 A1 1/2016 Needham et al.
2016/0017792 A1 * 1/2016 Fletcher .................. F16K 24/04 137/526
2016/0044862 A1 * 2/2016 Kocer ................. A01M 7/0089 111/118
2016/0084382 A1 * 3/2016 Pisasale ................... F16J 13/14 29/428
2016/0136671 A1 5/2016 Kocer
2016/0175869 A1 * 6/2016 Sullivan .............. A01M 7/0042 239/11

(56) References Cited

U.S. PATENT DOCUMENTS

| | | | |
|---|---|---|---|
| 2016/0178422 | A1 | 6/2016 | Humpal et al. |
| 2016/0227755 | A1* | 8/2016 | Preheim .............. A01M 7/0089 |
| 2016/0251008 | A1 | 9/2016 | Jeon et al. |
| 2016/0368011 | A1 | 12/2016 | Feldhaus et al. |
| 2017/0018345 | A1* | 1/2017 | Raff .................... F16K 31/0675 |
| 2017/0050206 | A1 | 2/2017 | Bullock et al. |
| 2017/0079200 | A1 | 3/2017 | Posselius et al. |
| 2017/0120263 | A1 | 5/2017 | Needham |
| 2017/0251656 | A1 | 9/2017 | Kolb et al. |
| 2017/0284285 | A1* | 10/2017 | Lenk ....................... F02B 37/16 |
| 2017/0314580 | A1 | 11/2017 | Steensma et al. |
| 2017/0348718 | A1* | 12/2017 | Preheim ............... A01C 23/007 |
| 2018/0042214 | A1 | 2/2018 | Preheim et al. |
| 2018/0111148 | A1 | 4/2018 | Batcheller et al. |
| 2018/0288934 | A1 | 10/2018 | Shivak |
| 2019/0029170 | A1 | 1/2019 | Wilger |
| 2019/0040972 | A1 | 2/2019 | Schrader |
| 2019/0047694 | A1 | 2/2019 | Zivan et al. |
| 2019/0321844 | A1 | 10/2019 | Schrader et al. |
| 2019/0350187 | A1 | 11/2019 | Kocer et al. |
| 2019/0373880 | A1 | 12/2019 | Kocer et al. |
| 2020/0037519 | A1 | 2/2020 | Wonderlich et al. |
| 2020/0101480 | A1 | 4/2020 | Schrader et al. |
| 2020/0107538 | A1 | 4/2020 | Preheim et al. |
| 2020/0113170 | A1 | 4/2020 | Davis et al. |
| 2020/0113171 | A1 | 4/2020 | Davis et al. |
| 2020/0214193 | A1 | 7/2020 | Shivak |
| 2020/0217894 | A1 | 7/2020 | Ferrarini et al. |
| 2020/0221682 | A1 | 7/2020 | Grimm et al. |
| 2020/0253111 | A1 | 8/2020 | Schlipf et al. |
| 2020/0406281 | A1* | 12/2020 | Funseth ................ B05B 1/1645 |
| 2021/0000006 | A1 | 1/2021 | Ellaboudy et al. |
| 2021/0076977 | A1 | 3/2021 | Abeyratne et al. |
| 2021/0102637 | A1* | 4/2021 | Krosschell .......... F16K 31/0675 |
| 2021/0144906 | A1 | 5/2021 | Shivak et al. |
| 2021/0176977 | A1 | 6/2021 | Bremer et al. |
| 2021/0219538 | A1 | 7/2021 | Krosschell et al. |
| 2021/0282315 | A1 | 9/2021 | Charcosset |
| 2021/0289693 | A1 | 9/2021 | Harmon et al. |
| 2021/0400946 | A1 | 12/2021 | Burgers et al. |
| 2022/0079132 | A1 | 3/2022 | Preheim et al. |
| 2022/0099213 | A1 | 3/2022 | Krosschell et al. |
| 2023/0049963 | A1 | 2/2023 | Kocer et al. |
| 2023/0141867 | A1 | 5/2023 | Krosschell et al. |
| 2023/0329220 | A1 | 10/2023 | Krosschell et al. |

FOREIGN PATENT DOCUMENTS

| | | | |
|---|---|---|---|
| AU | 2005247004 | | 12/2006 |
| AU | 2006202376 | B2 | 12/2006 |
| AU | 2009203181 | A1 | 2/2010 |
| AU | 2012201357 | A1 | 9/2012 |
| AU | 2013203361 | A1 | 10/2013 |
| AU | 2013204455 | A1 | 3/2014 |
| AU | 2013248190 | | 5/2014 |
| AU | 2013277513 | B2 | 3/2017 |
| AU | 2015204319 | | 4/2019 |
| AU | 2017285727 | B2 | 7/2020 |
| AU | 2020357581 | | 5/2022 |
| AU | 2023214344 | | 8/2023 |
| AU | 2021439481 | B2 | 7/2025 |
| AU | 2023214344 | B2 | 11/2025 |
| CA | 2229852 | A1 | 8/1998 |
| CA | 2517031 | A1 | 9/2004 |
| CA | 2528708 | A1 | 11/2006 |
| CA | 2549300 | A1 | 12/2006 |
| CA | 2674527 | A1 | 2/2010 |
| CA | 2770013 | A1 | 9/2012 |
| CA | 2811726 | A1 | 10/2013 |
| CA | 2813949 | A1 | 2/2014 |
| CA | 2830306 | | 4/2014 |
| CA | 2926448 | A1 | 4/2015 |
| CA | 2926448 | C | 9/2020 |
| CA | 3049421 | C | 3/2023 |
| CN | 102435019 | A | 5/2012 |
| CN | 202255911 | U | 5/2012 |
| CN | 102266829 | B | 12/2012 |
| CN | 203264929 | U | 11/2013 |
| DE | 102011053182 | | 3/2013 |
| DE | 112017003084 | T5 | 6/2019 |
| EP | 0576121 | B1 | 3/1996 |
| EP | 969712 | | 1/2000 |
| EP | 0963255 | B1 | 10/2002 |
| EP | 0847307 | B2 | 1/2003 |
| EP | 1426112 | B1 | 6/2011 |
| FR | 2964047 | A1 | 3/2012 |
| GB | 990346 | A | 4/1965 |
| GB | 2322573 | A | 9/1998 |
| JP | 2759711 | B2 | 5/1998 |
| JP | 2000139245 | A | 5/2000 |
| JP | 2005161221 | A | 6/2005 |
| WO | WO-9712688 | A1 | 4/1997 |
| WO | WO1997012688 | A1 | 4/1997 |
| WO | WO-98037751 | | 9/1998 |
| WO | WO-9842178 | A1 | 10/1998 |
| WO | WO-9916007 | A1 | 4/1999 |
| WO | WO-2004023865 | | 3/2004 |
| WO | WO-2004081499 | | 9/2004 |
| WO | WO-2005048704 | A2 | 6/2005 |
| WO | WO-2008059984 | A1 | 5/2008 |
| WO | WO-2008112930 | A1 | 9/2008 |
| WO | WO-2010105221 | A1 | 9/2010 |
| WO | WO-2012022903 | A1 | 2/2012 |
| WO | WO-2013135430 | A1 | 9/2013 |
| WO | WO-2013191990 | A2 | 12/2013 |
| WO | WO-2013191990 | A3 | 12/2013 |
| WO | WO-2014201008 | A1 | 12/2014 |
| WO | WO-2014210043 | A1 | 12/2014 |
| WO | WO-2015058091 | A1 | 4/2015 |
| WO | WO-2016145081 | A2 | 9/2016 |
| WO | WO-2017124175 | A1 | 7/2017 |
| WO | WO-2017192625 | A1 | 11/2017 |
| WO | WO-2017223252 | A1 | 12/2017 |
| WO | WO-2018129323 | A1 | 7/2018 |
| WO | WO-2018129376 | A2 | 7/2018 |
| WO | WO-2018129376 | A3 | 7/2018 |
| WO | WO-2021066962 | A1 | 4/2021 |
| WO | WO-2021263024 | A1 | 12/2021 |
| WO | WO-2022216285 | A1 | 10/2022 |
| WO | WO-2023081371 | A1 | 5/2023 |
| WO | 2023215178 | | 11/2023 |

OTHER PUBLICATIONS

"U.S. Appl. No. 18/164,321, Non Final Office Action mailed Jun. 4, 2024", 7 pgs.

"Brazilian Application Serial No. BR112022006486-1, Office Action mailed Jul. 13, 2024", w English translation, 9 pgs.

"International Application Serial No. PCT US2023 020275, International Preliminary Report on Patentability mailed Aug. 29, 2024", 10 pgs.

"Australian Application Serial No. 2023214344, First Examination Report mailed Sep. 9, 2024", 2 pgs.

"Australian Application Serial No. 2021439481, First Examination Report mailed Sep. 19, 2024", 3 pgs.

U.S. Appl. No. 17/224,955 U.S. Pat. No. 11,612,160, filed Apr. 7, 2021, Valve Control System and Method.

U.S. Appl. No. 18/164,321, filed Feb. 3, 2023, Valve Control System and Method.

U.S. Appl. No. 18/052,758, filed Nov. 4, 2022, Valve Priming and Depriming.

"Agrifac Pulse-width modulation (PWM) spraying", (c) 2021 Agrifac Machinery B.V. [online]. [archived Jan. 16, 2021]. Retrieved from the Internet: <URL: https://web.archive.org/web/20210116150413/https://www.agrifac.com/optional-spray-technology/strictsprayplus/>, (Jan. 16, 2021), 15 pgs.

"U.S. Appl. No. 13/776,285, Amendment and Response under 37 C.F.R. Sec. 1.114 filed Apr. 27, 2015", 13 pgs.

"U.S. Appl. No. 13/776,285, Non Final Office Action mailed Jul. 30, 2014", 15 pgs.

(56) References Cited

OTHER PUBLICATIONS

"U.S. Appl. No. 13/776,285, Notice of Allowance mailed Jan. 27, 2015", 5 pgs.
"U.S. Appl. No. 13/776,285, Notice of Allowance mailed May 4, 2015", 6 pgs.
"U.S. Appl. No. 13/776,285, Response filed Dec. 30, 2014 to Non Final Office Action mailed Jul. 30, 2014", 25 pgs.
"U.S. Appl. No. 13/832,678, Advisory Action mailed Jun. 3, 2016", 3 pgs.
"U.S. Appl. No. 13/832,678, Final Office Action mailed Mar. 17, 2016", 12 pgs.
"U.S. Appl. No. 13/832,678, Non Final Office Action mailed Oct. 1, 2015", 15 pgs.
"U.S. Appl. No. 13/832,678, Notice of Allowance mailed Jul. 20, 2016", 13 pgs.
"U.S. Appl. No. 13/832,678, Response filed May 12, 2016 to Final Office Action mailed Mar. 17, 2016", 10 pgs.
"U.S. Appl. No. 13/832,678, Response filed Jul. 27, 2015 to Restriction Requirement mailed Jun. 9, 2015", 7 pgs.
"U.S. Appl. No. 13/832,678, Response filed Dec. 31, 2015 to Non Final Office Action mailed Oct. 1, 2015", 10 pgs.
"U.S. Appl. No. 13/832,678, Restriction Requirement mailed Jun. 9, 2015", 7 pgs.
"U.S. Appl. No. 13/832,735, Final Office Action mailed Aug. 5, 2016", 29 pgs.
"U.S. Appl. No. 13/832,735, Non Final Office Action mailed Feb. 19, 2016", 26 pgs.
"U.S. Appl. No. 13/832,735, Non Final Office Action mailed Jul. 15, 2015", 22 pgs.
"U.S. Appl. No. 13/832,735, Response filed May 19, 16 to Non Final Office Action mailed Feb. 19, 2016", 13 pgs.
"U.S. Appl. No. 13/832,735, Response filed Nov. 16, 2015 to Non-Final Office Action mailed Jul. 15, 2015", 16 pgs.
"U.S. Appl. No. 14/300,761, Advisory Action mailed Dec. 12, 2017", 3 pgs.
"U.S. Appl. No. 14/300,761, Examiner Interview Summary mailed Nov. 22, 2017", 3 pgs.
"U.S. Appl. No. 14/300,761, Final Office Action mailed Aug. 31, 2017", 11 pgs.
"U.S. Appl. No. 14/300,761, Final Office Action mailed Nov. 27, 2018", 16 pgs.
"U.S. Appl. No. 14/300,761, Final Office Action mailed Dec. 18, 2020", 14 pgs.
"U.S. Appl. No. 14/300,761, Non Final Office Action mailed Feb. 8, 2017", 13 pgs.
"U.S. Appl. No. 14/300,761, Non Final Office Action mailed Apr. 15, 2020", 17 pgs.
"U.S. Appl. No. 14/300,761, Non Final Office Action mailed May 24, 2018", 16 pgs.
"U.S. Appl. No. 14/300,761, Notice of Allowance mailed May 7, 2021", 16 pgs.
"U.S. Appl. No. 14/300,761, Notice of Allowance mailed Sep. 9, 2021", 16 pgs.
"U.S. Appl. No. 14/300,761, Response filed Apr. 19, 2021 to Final Office Action mailed Dec. 18, 2020", 19 pgs.
"U.S. Appl. No. 14/300,761, Response filed Jun. 7, 2017 to Non Final Office Action mailed Feb. 8, 2017", 16 pgs.
"U.S. Appl. No. 14/300,761, Response filed Oct. 15, 2020 to Non Final Office Action mailed Apr. 15, 2020", 17 pgs.
"U.S. Appl. No. 14/300,761, Response filed Oct. 24, 2018 to Non Final Office Action mailed May 24, 2018", 22 pgs.
"U.S. Appl. No. 14/300,761, Response filed Nov. 29, 2019 to Final Office Action mailed Nov. 27, 2018", 21 pgs.
"U.S. Appl. No. 14/300,761, Response filed Dec. 20, 2016 to Restriction Requirement mailed Oct. 20, 2016", 15 pgs.
"U.S. Appl. No. 14/300,761, Resposne filed Nov. 16, 2017 to Final Office Action mailed Aug. 31, 2017", 16 pgs.
"U.S. Appl. No. 14/300,761, Restriction Requirement mailed Oct. 20, 2016", (9 pgs).
"U.S. Appl. No. 14/727,535, Corrected Notice of Allowance mailed Jan. 12, 2018", 2 pgs.
"U.S. Appl. No. 14/727,535, Final Office Action mailed Jun. 21, 2017", 6 pgs.
"U.S. Appl. No. 14/727,535, Non Final Office Action mailed Feb. 16, 2017", 17 pgs.
"U.S. Appl. No. 14/727,535, Notice of Allowance mailed Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement mailed Nov. 17, 2016", 12 pgs.
"U.S. Appl. No. 14/727,535, Response filed May 6, 2017 to Non Final Office Action mailed Feb. 16, 2017", 18 pgs.
"U.S. Appl. No. 14/727,535, Response filed Aug. 14, 2017 to Final Office Action mailed Jun. 21, 2017", 9 pgs.
"U.S. Appl. No. 14/727,535, Restriction Requirement mailed Nov. 17, 2016", 6 pgs.
"U.S. Appl. No. 14/899,946, Final Office Action mailed Dec. 28, 2018", 41 pgs.
"U.S. Appl. No. 14/899,946, Non Final Office Action mailed Mar. 26, 2018", 37 pgs.
"U.S. Appl. No. 14/899,946, Response filed Aug. 27, 2018 to Non Final Office Action mailed Mar. 26, 2018", 27 pgs.
"U.S. Appl. No. 15/029,935, Final Office Action mailed Jul. 11, 2017", 6 pgs.
"U.S. Appl. No. 15/029,935, Non Final Office Action mailed Mar. 30, 2017", 21 pgs.
"U.S. Appl. No. 15/029,935, Notice of Allowance mailed Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action mailed Jul. 11, 2017", 11 pgs.
"U.S. Appl. No. 15/029,935, Response filed Jun. 15, 2017 to Non Final Office Action mailed Mar. 30, 2017", 12 pgs.
"U.S. Appl. No. 15/585,034, Non Final Office Action mailed Nov. 2, 2018", 25 pgs.
"U.S. Appl. No. 15/629,696, Corrected Notice of Allowability mailed Aug. 29, 2018", 4 pgs.
"U.S. Appl. No. 15/629,696, Corrected Notice of Allowability mailed Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response filed Nov. 13, 2018 to Examiner's Reasons for Allowance mailed May 3, 2018", 2 pgs.
"U.S. Appl. No. 15/703,818, Corrected Notice of Allowability mailed Jul. 8, 2019", 2 pgs.
"U.S. Appl. No. 15/703,818, Non Final Office Action mailed Oct. 11, 2018", 6 pgs.
"U.S. Appl. No. 15/703,818, Notice of Allowance mailed Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action mailed Oct. 11, 2018", 9 pgs.
"U.S. Appl. No. 15/821,113, Corrected Notice of Allowability mailed Jan. 2, 2020", 2 pgs.
"U.S. Appl. No. 15/821,113, Corrected Notice of Allowability mailed Jan. 28, 2020", 2 pgs.
"U.S. Appl. No. 15/821,113, Ex Parte Quayle Action mailed Aug. 9, 2019", 4 pgs.
"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.

(56) References Cited

OTHER PUBLICATIONS

"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement mailed Nov. 30, 2018", 6 pgs.
"U.S. Appl. No. 16/447,779, Corrected Notice of Allowability mailed May 26, 2021", 2 pgs.
"U.S. Appl. No. 16/447,779, Corrected Notice of Allowability mailed Sep. 9, 2021", 2 pgs.
"U.S. Appl. No. 16/447,779, Non Final Office Action mailed Jan. 12, 2021", 9 pgs.
"U.S. Appl. No. 16/447,779, Notice of Allowance mailed May 20, 2021", 5 pgs.
"U.S. Appl. No. 16/447,779, Preliminary Amendment filed Dec. 30, 2019", 4 pgs.
"U.S. Appl. No. 16/447,779, Response filed Apr. 12, 2021 to Non Final Office Action mailed Jan. 12, 2021", 7 pgs.
"U.S. Appl. No. 16/476,016, Examiner Interview Summary mailed Jan. 27, 2023", 2 pgs.
"U.S. Appl. No. 16/476,016, Examiner Interview Summary mailed Apr. 15, 2022", 2 pgs.
"U.S. Appl. No. 16/476,016, Examiner Interview Summary mailed Oct. 4, 2022", 2 pgs.
"U.S. Appl. No. 16/476,016, Final Office Action mailed Jan. 11, 2022", 15 pgs.
"U.S. Appl. No. 16/476,016, Final Office Action mailed Nov. 15, 2022", 20 pgs.
"U.S. Appl. No. 16/476,016, Non Final Office Action mailed Mar. 28, 2023", 22 pgs.
"U.S. Appl. No. 16/476,016, Non Final Office Action mailed Jun. 24, 2022", 15 pgs.
"U.S. Appl. No. 16/476,016, Non Final Office Action mailed Aug. 31, 2021", 14 pgs.
"U.S. Appl. No. 16/476,016, Preliminary Amendment filed Jul. 3, 2019", 12 pgs.
"U.S. Appl. No. 16/476,016, Response filed Feb. 15, 2023 to Final Office Action mailed Nov. 15, 2022", 24 pgs.
"U.S. Appl. No. 16/476,016, Response filed Apr. 11, 2022 to Final Office Action mailed Jan. 11, 2022", 18 pgs.
"U.S. Appl. No. 16/476,016, Response filed Jul. 28, 2021 to Restriction Requirement mailed Apr. 30, 2021", 12 pgs.
"U.S. Appl. No. 16/476,016, Response filed Oct. 24, 2022 to Non Final Office Action mailed Jun. 24, 2022", 22 pgs.
"U.S. Appl. No. 16/476,016, Response filed Nov. 29, 2021 to Non Final Office Action mailed Aug. 31, 2021", 19 pgs.
"U.S. Appl. No. 16/476,016, Restriction Requirement mailed Apr. 30, 2021", 8 pgs.
"U.S. Appl. No. 16/476,069, Corrected Notice of Allowability mailed Jan. 30, 2023", 2 pgs.
"U.S. Appl. No. 16/476,069, Examiner Interview Summary mailed Mar. 18, 2022", 2 pgs.
"U.S. Appl. No. 16/476,069, Examiner Interview Summary mailed U.S. Appl. No. 16/476,069, Examiner Interview Summary mailed Oct. 28, 2022", 2 pgs.
"U.S. Appl. No. 16/476,069, Final Office Action mailed Jul. 25, 2022", 13 pgs.
"U.S. Appl. No. 16/476,069, Non Final Office Action mailed Nov. 12, 2021", 13 pgs.
"U.S. Appl. No. 16/476,069, Notice of Allowance mailed Jan. 19, 2023", 8 pgs.
"U.S. Appl. No. 16/476,069, Notice of Allowance mailed Apr. 20, 2023", 8 pgs.
"U.S. Appl. No. 16/476,069, Preliminary Amendment filed Jul. 3, 2019", 13 pgs.
"U.S. Appl. No. 16/476,069, Response filed Apr. 11, 2022 to Non Final Office Action mailed Nov. 12, 2021", 12 pgs.
"U.S. Appl. No. 16/476,069, Response filed Jul. 27, 2021 to Restriction Requirement mailed May 3, 2021", 10 pgs.
"U.S. Appl. No. 16/476,069, Response filed Oct. 25, 2022 to Final Office Action mailed Jul. 25, 2022", 13 pgs.
"U.S. Appl. No. 16/476,069, Restriction Requirement mailed May 3, 2021", 9 pgs.
"U.S. Appl. No. 16/731,325, Corrected Notice of Allowability mailed Jun. 15, 2021", 2 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Mar. 23, 2021", 5 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Preliminary Amendment filed Jan. 28, 2021", 8 pgs.
"U.S. Appl. No. 17/224,955, Final Office Action mailed Aug. 15, 2022", 6 pgs.
"U.S. Appl. No. 17/224,955, Non Final Office Action mailed Mar. 7, 2022", 7 pgs.
"U.S. Appl. No. 17/224,955, Notice of Allowance mailed Oct. 27, 2022", 5 pgs.
"U.S. Appl. No. 17/224,955, Response filed Aug. 3, 2022 to Non Final Office Action mailed Mar. 7, 2022", 12 pgs.
"U.S. Appl. No. 17/224,955, Supplemental Notice of Allowability mailed Feb. 22, 2023", 2 pgs.
"U.S. Appl. No. 17/224,955, Supplemental Notice of Allowability mailed Mar. 1, 2023", 2 pgs.
"U.S. Appl. No. 17/410,852, Preliminary Amendment filed Dec. 10, 2021", 8 pgs.
"U.S. Appl. No. 17/465,644, Preliminary Amendment filed Dec. 17, 2021", 11 pgs.
"U.S. Appl. No. 17/504,601, Preliminary Amendment filed Dec. 22, 2021", 7 pgs.
"U.S. Appl. No. 17/809,223, Non Final Office Action mailed Feb. 15, 2023", 15 pgs.
"U.S. Appl. No. 17/809,223, Preliminary Amendment filed Nov. 3, 2022", 7 pgs.
"U.S. Appl. No. 18/164,321, Preliminary Amendment Filed Jul. 7, 2023", 7 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 2 pgs.

(56) References Cited

OTHER PUBLICATIONS

"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 8 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Australian Application Serial No. 2020357581, First Examination Report mailed Feb. 2, 2023", 2 pgs.
"Australian Application Serial No. 2021209314, First Examination Report mailed Jan. 9, 2023", 5 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Office Action mailed Nov. 6, 2018", (w/ English Translation), 6 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Office Action mailed Sep. 6, 2022", w/ English Translation, 6 pgs.
"Brazilian Application Serial No. 1120180747017, Opinion for non-patenteability (RPI 7.1) mailed Mar. 29, 2022", (w/ English Translation), 18 pgs.
"Brazilian Application Serial No. 1120180747017, Response filed Jul. 4, 2022 Opinion for non- patentability (RPI 7.1) mailed Mar. 29, 2022", (w/ Concise Statement of Relevance), 22 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Response filed Dec. 5, 2022 to Office Action mailed Sep. 6, 2022", w/ English Translation, 2 pgs.
"Brazilian Application Serial No. 1120180747017, Voluntary Amendment filed Jun. 22, 2020", (w/ English Translation), 44 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Apr. 8, 2021 to Office Action mailed Dec. 9, 2020", 16 pgs.
"Canadian Application Serial No. 2,877,195, Response filed Dec. 18, 2019 to Office Action mailed Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Jul. 23, 2019", 3 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 18", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Office Action mailed Sep. 4, 2020", 4 pgs.
"Canadian Application Serial No. 3,049,391, Office Action mailed Sep. 26, 2022", 4 pgs.
"Canadian Application Serial No. 3,049,391, Office Action mailed Dec. 1, 2021", 4 pgs.
"Canadian Application Serial No. 3,049,391, Response filed Jan. 20, 2023 to Office Action mailed Sep. 26, 2022", 7 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"Canadian Application Serial No. 3153465, Examiners Rule 86(2) Report mailed Jan. 13, 2023", 3 pgs.
"Canadian Application Serial No. 3153465, Response filed May 1, 2023 to Examiners Rule 86(2) Report mailed Jan. 13, 2023", 2 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. 18735853.6, Communication Pursuant to Article 94(3) EPC mailed Apr. 3, 2023", 4 pgs.
"European Application Serial No. 18735853.6, Communication Pursuant to Article 94(3) EPC mailed Jun. 10, 2022", 3 pgs.
"European Application Serial No. 18735853.6, Communication Pursuant to Article 94(3) EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communiciation pursuant to Rules 161(2) and 162 EPC mailed Aug. 13, 2019", 16 pgs.
"European Application Serial No. 18735853.6, Response filed Oct. 18, 2022 to Communication Pursuant to Article 94(3) EPC mailed Jun. 10, 2022", 24 pgs.
"European Application Serial No. 18735853.6, Response filed Oct. 28, 2021 to Communication Pursuant to Article 94(3) EPC mailed Jun. 18, 2021", 17 pgs.
"European Application Serial No. 18736496.3, Communication Pursuant to Article 94(3) EPC mailed Mar. 24, 2023", 10 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.

(56) References Cited

OTHER PUBLICATIONS

"European Application Serial No. 18736496.3, Response to Communication Pursuant to Rules 161(2) and 162 EPC filed Feb. 28, 2020", 14 pgs.
"European Application Serial No. 20872967.3, Response to Communication Pursuant to Rules 161 and 162 EPC filed Nov. 17, 2022", 9 pgs.
"German Application Serial No. 11 2017 003 084.6, Office Action mailed Feb. 5, 2019", (w/ English Translation), 5 pgs.
"German Application Serial No. 11 2017 003 084.6, Response filed May 8, 2019 to Office Action mailed Feb. 5, 2019", (w/ Concise Statement of Relevance), 17 pgs.
"International Application Serial No. PCT/US2013/045445, International Preliminary Report on Patentability mailed Dec. 31, 2014", 7 pgs.
"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.
"International Application Serial No. PCT/US2014/043926, International Search Report mailed Nov. 3, 2014", 2 pgs.
"International Application Serial No. PCT/US2014/043926, Written Opinion mailed Nov. 3, 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.
"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 28, 2017", 5 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Preliminary Report on Patentability mailed Apr. 14, 2022", 6 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/026252, International Search Report mailed Jun. 15, 2021", 2 pgs.
"International Application Serial No. PCT/US2021/026252, Written Opinion mailed Jun. 15, 2021", 4 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.
"International Application Serial No. PCT/US2022/048981, International Search Report mailed Apr. 13, 2023", 6 pgs.
"International Application Serial No. PCT/US2022/048981, Invitation to Pay Additional Fees mailed Jan. 19, 2023", 5 pgs.
"International Application Serial No. PCT/US2022/048981, Written Opinion mailed Apr. 13, 2023", 18 pgs.
"Wilger 2019-2020 Manufacturer's Suggested Retail Price List", (Revised Sep. 1, 2019), 20 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Dietz, John, "A five-part program for efficient farming", Farming, (Apr. 2000), 1-4.
Elmore, Clyde L., "Soil Solarization A Nonpesticidal Method for Controlling Diseases, Nematodes, and Weeds", University of California Division of Agriculture and Natural Resources Publication 21377, (1997), 1-17.
Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
Van Zuydam, R. P, "A driver's steering aid for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements In the Open Field by Means of Real Time Kinematic Dgps", Proceedings of the Fourth International Conference on Precision Agriculture, (1999), 1023-1034.
"International Application Serial No. PCT US2023 020275, International Search Report mailed Jul. 26, 2023", 2 pgs.
"International Application Serial No. PCT US2023 020275, Written Opinion mailed Jul. 26, 2023", 12 pgs.
"European Application Serial No. 20872967.3, Extended European Search Report mailed Sep. 29, 2023", 9 pgs.
"International Application Serial No. PCT US2021 026252, International Preliminary Report on Patentability mailed Oct. 19, 2023", 6 pgs.
Luck, "A Case Study Concerning The Effects Of Controller Response And Turning Movements On Application Rate Uniformity With A Self-Propelled Sprayer", Biological Systems Engineering, University of Nebraska, [Online]. Retrieved from the Internet: https: elibrary.asabe.org abstract.asp?aid=36445, (Dec. 12, 2011), 10 pgs.
"U.S. Appl. No. 18/052,758, Notice of Allowance mailed May 9, 2025", 12 pgs.
"U.S. Appl. No. 18/164,321, Final Office Action mailed Nov. 20, 2024", 7 pgs.
"U.S. Appl. No. 18/164,321, Response filed May 7, 2025 to Final Office Action mailed Nov. 20, 2024", 9 pgs.
"U.S. Appl. No. 18/164,321, Response Filed Nov. 4, 2024 to Non Final Office Action mailed Jun. 4, 2024", 17 pgs.

(56) References Cited

OTHER PUBLICATIONS

"Australian Application Serial No. 2022382950, First Examination Report mailed Mar. 14, 2025", 3 pgs.
"Brazil Application Serial No. BR112022006486-1, Response filed Oct. 25, 2024 to Office Action mailed Jul. 13, 2024", w/ English Claims, 227 pgs.
"Canadian Application Serial No. 3,214,361, Office Action mailed Jan. 28, 2025", 6 pgs.
"European Application Serial No. 21936210.0, Extended European Search Report mailed Dec. 18, 2024", 11 pgs.
"European Application Serial No. 22890829.9, Response to Communication pursuant to Rules 161(1) and 162 EPC filed Dec. 12, 2024", 22 pgs.
"U.S. Appl. No. 18/052,758, Corrected Notice of Allowability mailed Jun. 10, 2025", 4 pgs.
"U.S. Appl. No. 18/052,758, Corrected Notice of Allowability mailed Aug. 18, 2025", 4 pgs.
"U.S. Appl. No. 18/052,758, Corrected Notice of Allowability mailed Sep. 16, 2025", 4 pgs.
"U.S. Appl. No. 18/164,321, Notice of Allowability mailed Aug. 15, 2025", 2 pgs.
"U.S. Appl. No. 18/164,321, Notice of Allowance mailed May 15, 2025", 5 pgs.
"U.S. Appl. No. 18/164,321, Notice of Allowance mailed Jun. 25, 2025", 9 pgs.
"U.S. Appl. No. 18/164,321, PTO Response to Rule 312 Communication mailed Jul. 15, 2025", 2 pgs.
"U.S. Appl. No. 18/164,321, Supplemental Notice of Allowability mailed Oct. 6, 2025", 2 pgs.
"U.S. Appl. No. 19/296,288, Preliminary Amendment Filed Oct. 27, 2025", 6 pgs.
"U.S. Appl. No. 19/350,572, Preliminary Amendment filed Dec. 10, 2025", 7 pgs.
"Australian Application Serial No. 2023214344, Response filed Jun. 18, 2025 to First Examination Report mailed Sep. 9, 2024", 154 pgs.
"Canadian Application Serial No. 3,214,361, Response filed May 23, 2025 to Office Action mailed Jan. 28, 2025", 94 pgs.
"Canadian Application Serial No. 3,251,820, Examiners Rule 86(2) Report mailed Nov. 6, 2025", 9 pgs.
"European Application Serial No. 21936210.0, Response filed Jul. 10, 2025 to Extended European Search Report mailed Dec. 18, 2024", 47 pgs.
"European Application Serial No. 22890829.9, Extended European Search Report mailed Sep. 2, 2025", 12 pgs.
"European Application Serial No. 23799847.1, Response to Communication Pursuant to Rules 161 and 162 EPC filed Jun. 5, 2025", 22 pgs.
"Australian Application Serial No. 2022382950, Response filed Feb. 16, 2026 to First Examination Report mailed Mar. 14, 2025", 162 pages.
"Canadian Application Serial No. 3,251,820, Response filed Mar. 5, 2026 to Examiners Rule 862 Report mailed Nov. 6, 2025", 65 pgs.
"Australian Application Serial No. 2022382950, Subsequent Examiners Report mailed Mar. 9, 2026", 5 pgs.
"Australian Application Serial No. 2023265421, First Examination Report mailed Feb. 19, 2026", 6 pgs.
"Australian Application Serial No. 2025256084, Voluntary Amendment filed Feb. 18, 2026", 21 pgs.
"European Application Serial No. 22890829.9, Response filed Mar. 19, 2026 to Extended European Search Report mailed Sep. 2, 2025", 32 pgs.
"European Application Serial No. 23799847.1, Extended European Search Report mailed Mar. 23, 2026", 9 pgs.
"Australian Application Serial No. 2026201878, Voluntary Amendment May 8, 2026", 16 pages.

* cited by examiner 1000
1010
1012
1014
1016
1020
Smart Nozzle
Master Node

VALVE CONTROL SYSTEMS AND METHODS

This patent application claims the benefit of priority of Krosschell et al., U.S. Provisional Patent Application Ser. No. 63/337,899, entitled "VALVE CONTROL SYSTEMS AND METHODS," filed on May 3, 2022, which is hereby incorporated by reference herein in its entirety.

TECHNICAL FIELD

This document pertains generally, but not by way of limitation, to agricultural equipment and valve control systems and methods.

BACKGROUND

Agricultural products (e.g., a liquid fertilizer, carrier fluid, granular product, herbicides, or the like) are typically applied to crops and weeds located in a farm field. In some examples, an agricultural product is applied with a sprayer system, for instance a sprayer mounted on a prime mover (e.g., a tractor, truck, all-terrain-vehicle, or the like). The sprayer system includes one or more valves which facilitate application of agricultural product to the field (e.g., by spraying the agricultural product from a nozzle). In some examples, a valve is operated by a controller, for instance to translate the valve between an open position and a closed position. In the open position, the valve permits flow of the agricultural product through the valve. In the closed position, the valve does not permit flow of the agricultural product through the valve (e.g., between a valve inlet and a valve outlet).

Overview

The present inventors have recognized, among other things, that a problem to be solved can include accurately applying an agricultural product to a field and optimizing coverage (e.g., minimizing or avoiding problematic skips and/or problematic double coverage) while applying the product. Double coverage can occur when the spray from adjacent nozzles overlap. For example, in agricultural spraying applications involving the use of multiple valves (and associated nozzles) on a boom, a control system can actuate the valves at a particular frequency (f) or cycle time (T) (where T is 1/f) and a particular duty cycle (e.g., amount of time a valve is open relative to the cycle time). The frequency can be selected to be relatively high (e.g., 30 to 40 Hz) to minimize skips in coverage and/or reduce double coverage; however, the inventors have recognized that operating valves at a high frequency suffers from drawbacks from more frequent actuation of the valves. More frequent valve actuation can cause increased valve wear, pressure changes which result in varying spray characteristics, and increased power consumption of the system, for example.

The present subject matter can help provide a solution to this problem, such as by providing systems and methods for applying agricultural product where an actuation time (e.g., a base frequency and/or a phase offset) for a valve can be dynamically determined based on multiple valve control inputs. For example, a sprayer control system for applying an agricultural product is provided. The system includes a plurality of smart nozzles for mounting along a boom, where each of the smart nozzles includes an electronic control unit (ECU), a control valve, and one or more spray nozzles. The system can further include a master node, where the master node and smart nozzle ECUs form a processing system for regulating the supply of agricultural product to the smart nozzles. The processing system (e.g., each ECU) can be configured to receive a plurality of valve control inputs for a respective control valve (e.g., a PWM valve associated with an ECU) and dynamically determining an actuation time for the respective control valve based on the inputs.

In an example, a determination of the actuation time can include dynamically determining a base frequency (or cycle time) and/or a phase offset for actuating the respective control valve. The processing system (e.g., each ECU) can, for example, include a frequency module that dynamically determines the base frequency based on one or more of a duty cycle for the respective control valve and a speed value associated with the valve (e.g., a speed of the smart nozzle associated with the valve). In one example, the frequency module receives an optimization input specifying a maximum skip value threshold, calculates a skip value indicative of a skip in coverage of the liquid agricultural product, and adjusts the base frequency based on the calculated skip value and maximum skip value threshold. In one example, the frequency module receives an optimization input specifying a maximum coverage value threshold (e.g., amount of double coverage), calculates a coverage value indicative of coverage of the liquid agricultural product, and adjusts the base frequency based on the calculated coverage value and maximum coverage value threshold. The base frequency can, e.g., be selected from a set of specified frequencies, with the selected base frequency being the lowest frequency of the set of specified frequencies for which the calculated optimization value (e.g., skip value and/or coverage value) does not exceed the maximum threshold value (e.g., skip threshold value and/or coverage value). In this way, product coverage can be maintained within the maximum threshold while the frequency of actuation of a valve can be reduced.

Using multiple valve control inputs to dynamically determine an actuation time (e.g., by dynamically determining a base frequency and/or phase offset) for a valve, can allow for more accurate application of the agricultural product and better system performance. For example, the system can operate at lower frequencies while optimizing coverage by minimizing or avoiding skips in coverage of the product and/or minimizing the amount of double coverage. This can provide advantages such as reducing wear of the valves and/or reducing power consumption of the system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
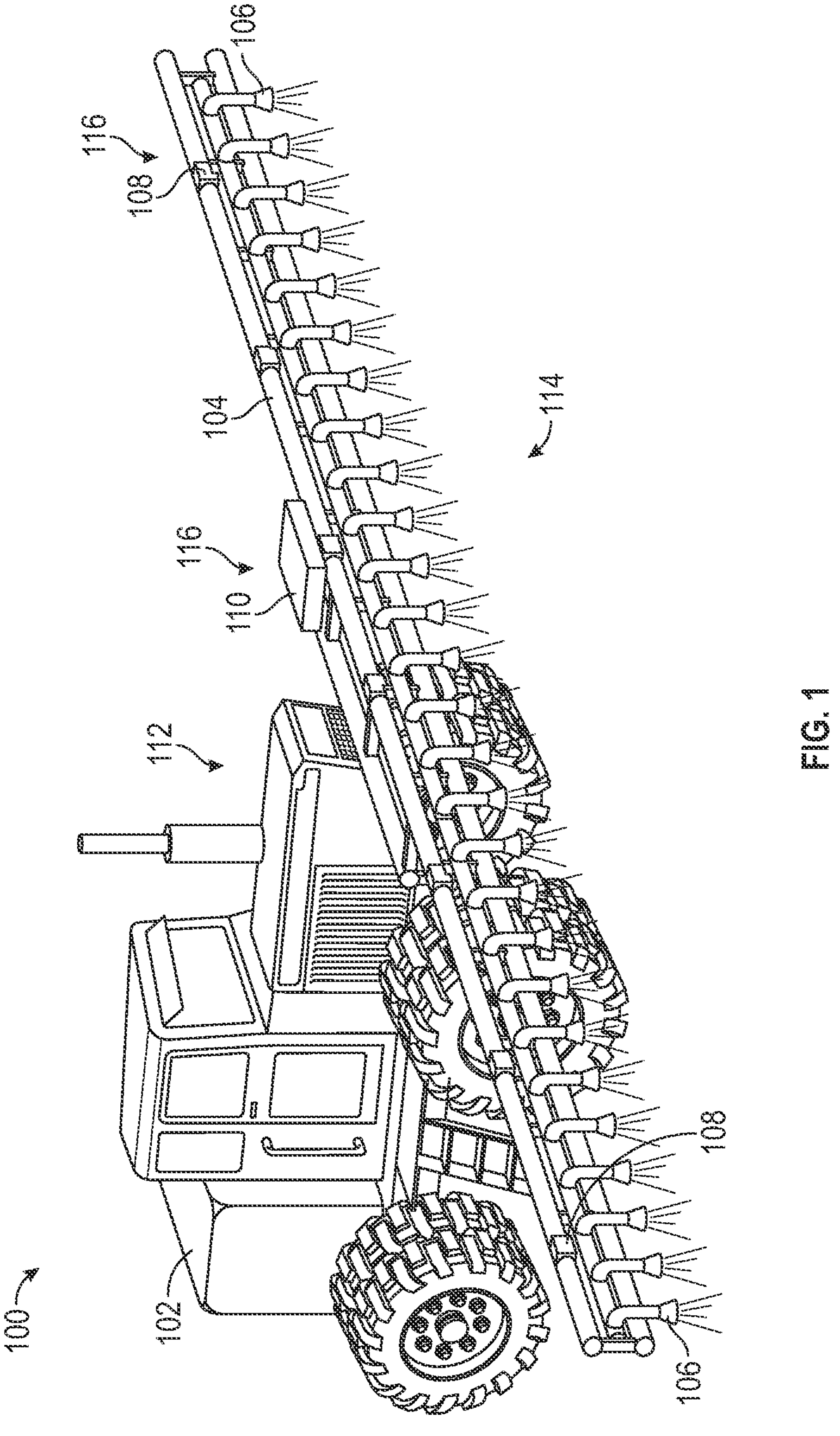
FIG. 1 illustrates a perspective view of an example of an agricultural sprayer.

FIG. 1 illustrates a perspective view of an example of an agricultural sprayer 100. In an example, the agricultural sprayer 100 includes a reservoir tank 102, one or more sprayer booms 104, and a plurality of nozzles 106. The example agricultural sprayer 100 also includes one or more electronic control units (ECUs) 108 (e.g., a microprocessor based system) and a master node 110. (e.g., a microprocessor based system). While not shown in FIG. 1, the sprayer also includes a plurality of valves, with each valve being associated with one or more nozzles. As will be discussed further below, the valves can be divided into two or more subgroups and within each subgroup successive valves can be actuated with a time delay based on a vehicle speed input. Each ECU 108 (or the master node 110) can also determine a base frequency for its respective valve(s) (e.g., the time between successive actuations of the same valve) and any phase offset (e.g., a time delay) in a dynamic manner and actuate its respective valve(s) based on the determined base frequency modified by the phase offset. For ease of reading, we describe the subject matter with respect to frequency. It should be appreciated however that, as used herein, reference to frequency (f) includes period or cycle time (T) (which is the inverse of frequency ($T=1/f$)), and reference to determining or changing a frequency includes determining or changing a period or cycle time.

In an example, the reservoir tank 102 is integral with a prime mover 112 (e.g., a tractor, truck, combine, vehicle, or the like). In some examples, the reservoir tank 102 is a towed behind the prime mover 112 (e.g., the reservoir tank 102 is included with a trailer, or the like). The reservoir tank 102, in an example, includes an agricultural product mixed with a carrier fluid, such as water. In some examples, the carrier fluid and the agricultural product are mixed in-line prior to or at the sprayer boom 104. The nozzles 106 are positioned along the sprayer boom 104 to deliver the agricultural product (and the carrier fluid) to a field, for instance a crop or weed located in an agricultural field 114. Crops include, but are not limited to, any product grown in an agricultural field, such as row and non-row based crops. Agricultural products include, but are not limited to, fertilizers, water, pesticides, fungicides, herbicides, or the like.

The agricultural sprayer 100 includes one or more controllers 116, for example the ECUs 108 and the master node 110. In an example, the master node 110 operates in conjunction with the one or more ECUs 108 to control delivery of the agricultural product from the reservoir tank 102, to the sprayer boom 104 and the associated nozzles 106 for delivery to the agricultural field or crop.

Figure 2:
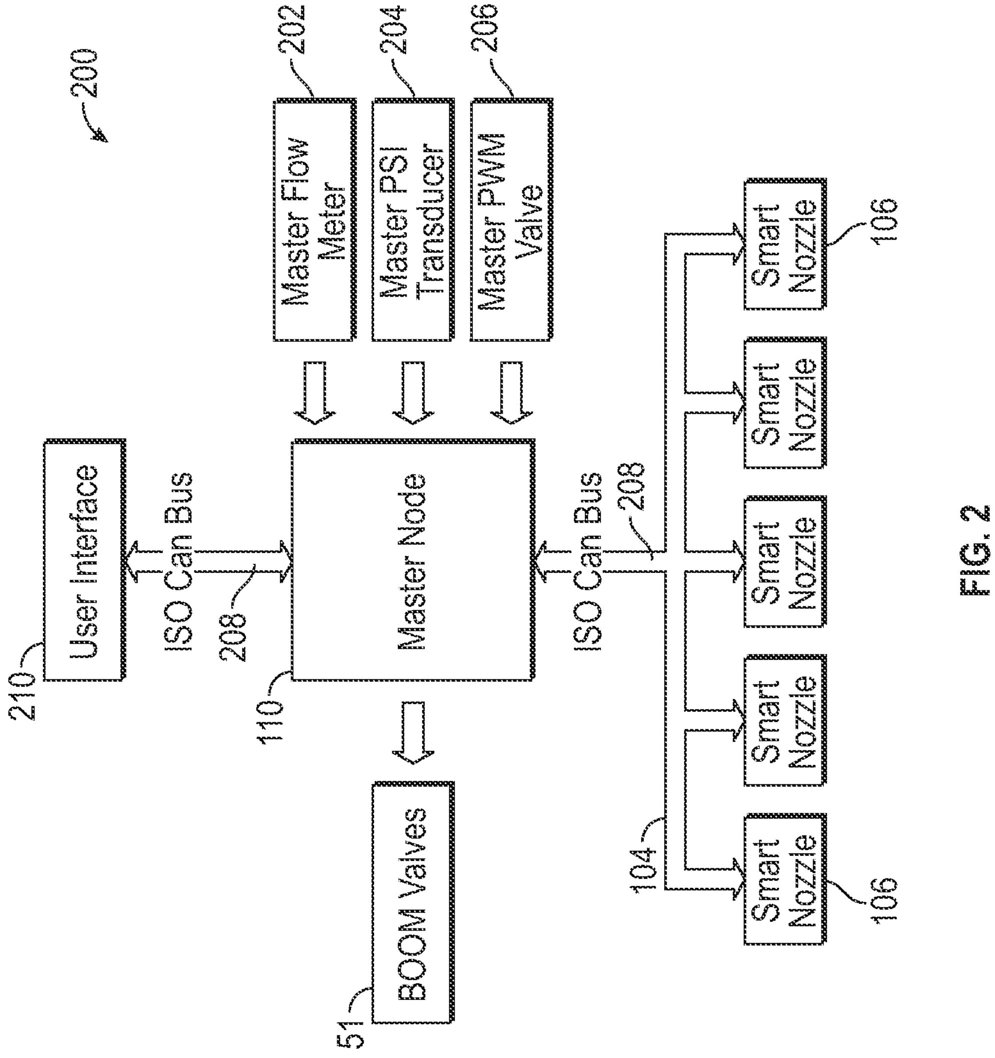
FIG. 2 illustrates a schematic of an exemplary nozzle control system.

FIG. 2 illustrates a schematic of an exemplary nozzle control system 200, wherein the one or more nozzles 106 located on the boom 104 control a respective nozzle flow rate of an agricultural product dispensed from the nozzle 106. As shown in FIG. 2, the master node 110 is communicatively coupled to one or more valves (e.g., the PWM valve 206) of the boom 104, such that system pressure within the boom 104 can be controlled by the master node 110. In some examples, the master node 110 of the current system is not configured to control the flow rate within the system 200, boom 104, or at the smart nozzles 106. Instead, the master node 110 controls the pressure within the system 200, boom 104, or at the smart nozzles 106, and the pressure control provides control of the flow rate (e.g., control to a lower pressure decreases flow while control to a higher pressure increases flow). The master node 110 is in communication with a master flowmeter 202, a master pressure transducer 204, and a master pulse width modulation (PWM) valve 206. The master node 110 controls the master PWM valve 206 to provide a targeted system pressure (through modulated operation of a system pump associated with the master PWM valve 206), such that a desired droplet size of the agricultural product is generated at the nozzles 106. For example, environmental conditions, such as wind, humidity, rain, temperature, field characteristics, or user preference determine whether a smaller or larger droplet size of the agricultural product is preferred. By controlling a targeted system pressure (e.g., maintaining, changing with variations in flow rate or the like), the preferred droplet size is maintained with the system 200.

Figure 3:
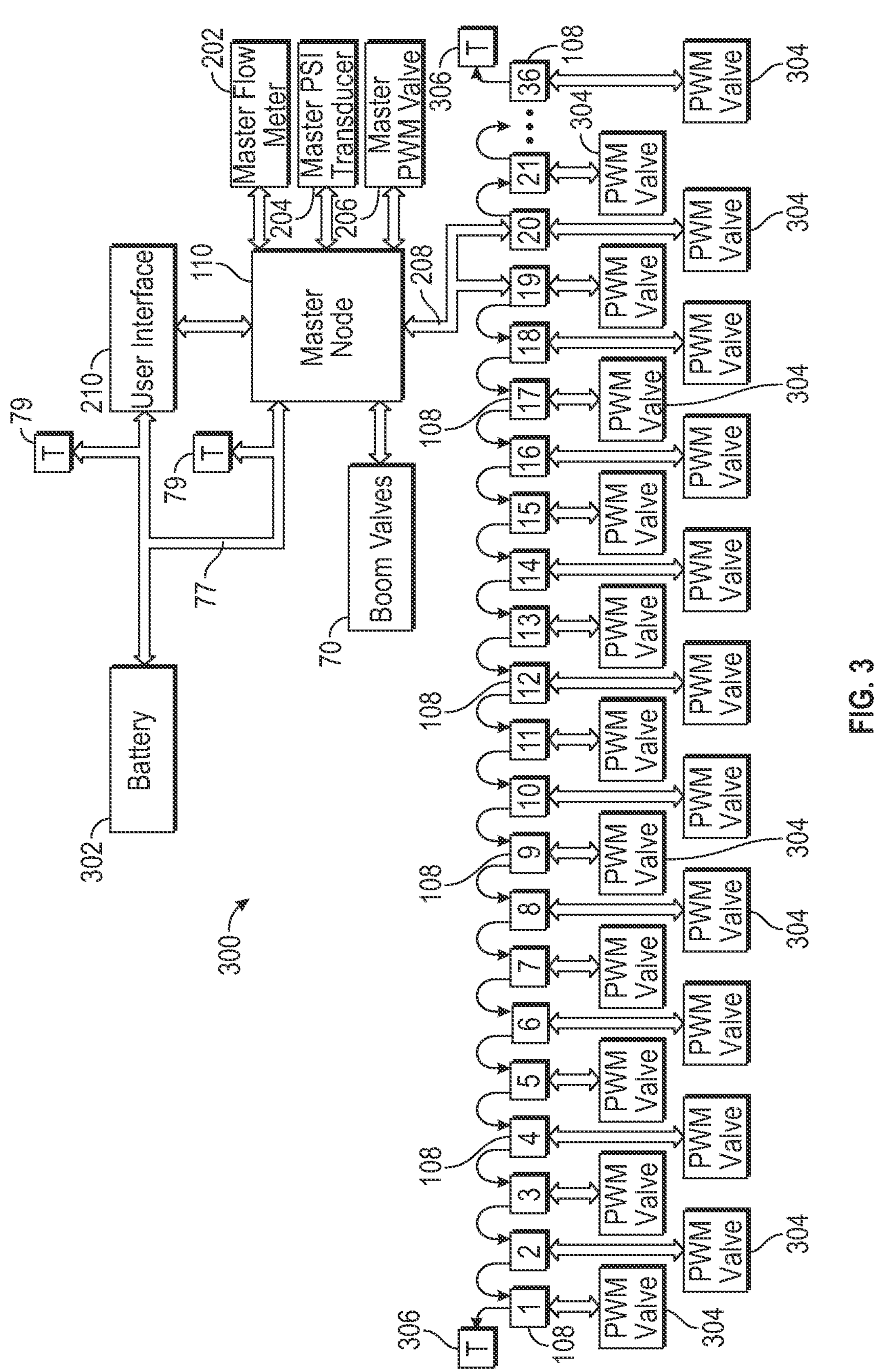
FIG. 3 illustrates a detailed schematic view of an exemplary nozzle control system.

In the exemplary embodiment, each of the nozzles 106 is a smart nozzle that includes an electronic control unit (ECU) (e.g., ECU 108, shown in FIG. 1 or the like) that regulates, determines, and/or controls the nozzle flow rate of the agricultural product dispensed from the nozzle 106, as discussed in reference to FIG. 3. In other embodiments, a group of the nozzles 106 are associated with a common ECU and is collectively considered a single smart nozzle. The smart nozzles 106 are connected to, for example, the boom 104 and communicatively coupled to a controller area network (e.g., nozzle CAN bus 208, wireless network or the like) of the overall control system 200. As discussed herein, the CAN bus 208 is configured to distribute overall system information from the master node 110 (e.g., master node). The ECU at each smart nozzle 106 uses data from the overall system information to regulate, determine, and/or control the nozzle flow rate of each corresponding smart nozzle 106. The ECU at each smart nozzle 106 can, for example, actuate the valve associated with the nozzle to dispense agricultural product.

The master node 110 controls one or more of a system pressure or system flow rate using, for example, the master pressure transducer 204 (or in other examples the flow meter, flow meter and pressure transducer together or the like) and the master pulse width modulation (PWM) valve 206. Although FIG. 2 illustrates a PWM valve as a master valve 206, embodiments are not so limited. For example, the master valve 206 includes any valve capable of controlling pressure or flow rate of a system, such as a ball valve, PWM valve, butterfly valve, hydraulic valve, or the like. In one example, a hydraulic valve controls hydraulic flow to a pump which in turn provides flow to the nozzles based on feedback from a pressure transducer. For instance, the master node 110 maintains the system pressure or flow rate at a target system value (e.g., a target system pressure or target system flow rate). In another example, each smart nozzle 106 controls the component flow rate to the constituent nozzles associated with each smart nozzle. In another example, the master node controls the system pressure or system flow rate to one or more target values and the smart nozzles 106 control the flow rate for each of the constituent nozzles (e.g., one or more) associated with each smart nozzle. Collectively, the smart nozzles 106 may control the overall agricultural product flow rate of the system.

In an example, the target system pressure is provided by a user, such as at the user interface 210 connected to the master node 110 by the nozzle CAN bus 208. In an additional example, the user also provides a target system flow rate (e.g., volume/area) at the user interface 210. In an example, the master node 110 provides one or more of the target system flow rate or the target system pressure to each of the one or more smart nozzles 106, such that each smart nozzle 106 (or each ECU, as discussed herein) determines an individual agricultural product flow rate (or pressure) for the smart nozzle 106. For example, the system target flow rate is divided by the number of nozzles 106 to provide a target agricultural product flow rate for each of the one or more nozzles 106. In an example, the master node 110 measures the flow rate (e.g., volume per time) with a master flow meter 202 and compares it with the overall target flow rate (e.g., designated by one or more of the user, crop type, soil characteristic, agricultural product type, historical data, or the like). The master node 110 is configured to determine a difference or error, if present, between the measured system flow rate and the target system flow rate. In such an example, the master node 110 provides the determined difference, by the nozzle CAN bus 208, to the individual nozzles 106 (or ECUs, as discussed herein). The one or more nozzles 106 receive the difference on the CAN bus 208 and adjust their pressure/flow/duty cycle curve using the difference (e.g., compensating for errors in the system) to reduce the error between the measured and target system flow rates (or reduce the error between the measured and target system pressures).

Additionally, in at least some examples, the master node 110 reports the actual pressure, measured by the master pressure transducer 204, as well as boom 104 information, including, but not limited to, one or more of yaw rate, speed, number of smart nozzles of the boom, distance between smart nozzles on the boom, to the smart nozzles 106 (or ECUs, as described herein) for individual flow rate control (or pressure control) of each of the smart nozzles 106. For example, the information provided from the master node 110 is used in addition to nozzle characteristics to control the individual flow rate control of each smart nozzle 106. Nozzle characteristics include, but are not limited to, one or more of nozzle position on a boom, length of the boom, nozzle spacing, target flow rate for the system (e.g., one or more of carrier fluid, injection product, agricultural product of the mixed carrier fluid and injection product, or the like), target pressure for the system (e.g., one or more of carrier fluid, injection product, agricultural product of the mixed carrier fluid and injection product, or the like), yaw rate of the boom, yaw rate of the agricultural sprayer, speed of the agricultural sprayer, one or more of the overall system pressure or flow rate (e.g., actual pressures or flow rates of the carrier fluid, injection product, mixed agricultural product or the like), agricultural product characteristics, valve performance such as a moveable valve operator transition time (including differences between specified and actual duty cycles), or the like.

The system 200 is configured for installation on an agricultural sprayer (e.g., the agricultural sprayer 100, shown in FIG. 1). In an example, the sprayer moves during operation (e.g., translates, rotates, accelerates or the like). The system optionally adjusts flow rates at one or more of the smart nozzles, concentrations of injection products delivered by the smart nozzles, or the like. Accordingly, the system provides a consistent application pattern of agricultural product to the crop. In another example, the one or more nozzle characteristics are dynamic and, and in some examples, the delivery of agricultural product by the nozzles is dynamic in correspondence with the nozzle characteristics. For instance, one or more of flow rates, pressures or the like through nozzles associated with a smart nozzle 106 dynamically change relative to other smart nozzles 106 of the system.

FIG. 3 illustrates a detailed schematic view of an exemplary nozzle control system 300. The control system 300 includes the master node 110 communicatively coupled to one or more valves of the boom 104, such that system pressure within the boom 104 can be controlled by the master node 110. Further, the master node 110 includes inputs from one or more of the master flowmeter 202, the master pressure transducer 204, and the master pulse width modulation (PWM) valve 206. Further, as described herein, the master node 110 is coupled to the user interface 210 and, in an example, a battery 302, so as to provide power to one or more of the master node 110 and user interface 210.

As shown in the embodiment of FIG. 3, a smart nozzle 106 optionally includes an ECU 108 coupled to a valve 304 (e.g., a PWM valve, ball valve, butterfly valve, or the like). That is, FIG. 3 illustrates 36 ECUs relating directly to 36 nozzles of the nozzle control system 300, but embodiments are not so limited. The master node 110 is communicatively coupled, by nozzle CAN bus 208 to ECU-18 and ECU-19, wherein ECU-18 108 and ECU-19 108 define a center region of the boom. From the center region of the boom, the ECUs 108 are communicatively coupled to another ECU 108 in the direction toward each terminal end 306 of the boom. As discussed further below, the ECUs 108 (and associated valves) can be divided into two or more subgroups. For example, in an even subgroup, ECU-18 is communicatively couple to ECU-16, which is communicatively coupled to ECU-14, and so forth until the optional terminator after ECU-2 is reached and the same pattern holds for the other half of the boom. In the odd subgroup, ECU-17 is communicatively couple to ECU-15, which is communicatively coupled to ECU-13, and so forth until the optional terminator after ECU-1 is reached and the same pattern holds for the other half of the boom. Although 36 ECUs 108 are illustrated, embodiments are not so limited. Although two subgroups are described, the ECUs/valves can be divided into more than two subgroups. The ECUs 108 in each subgroup can communicate in a daisy chain fashion using a CAN bus, a wireless network, and/or a wired network, for example.

Further, as shown in FIG. 3, each ECU 108 is coupled to one PWM valve 304, however, embodiments are not so limited. In another example, a single ECU 108 is communicatively coupled to more than one PWM valve 304. For instance, a single ECU 108 is communicatively coupled to more than one valve, such as every other valve, arrays of valves along portions of booms or the like. In an example, 12 ECUs split control of the 36 nozzles of the boom. In an example, a plurality of nozzles are partitioned into nozzle groups, such that each nozzle group includes an ECU 108 configured to control a nozzle group flow rate (or nozzle pressure that in turn controls flow) of the agricultural product dispensed from each nozzle of the nozzle group (by way of associated control valves) based on the nozzle characteristics, as described herein, of the respective nozzles. Thus, a smart nozzle includes, but is not limited to, a single nozzle, an associated valve and an associated ECU. In another example, a smart nozzle includes a group of nozzles (having associated valves) that are associated with a common ECU.

In still another example, the system 300 includes one or more location fiducials associated with the system 300, the one or more location fiducials are configured to mark the location of one or more nozzles (or ECUs) of the plurality of nozzles on a field map (e.g., indexed with product flow rates, moisture content, crop type, agricultural product type, or the like). Optionally, each of the nozzles, nozzle groups, or ECUs 108 of the system is configured to control the agricultural product at individual rates according to the location of the one or more nozzles (or ECUs 108), the movement of the one or more nozzles relative to the field, another frame of reference or the like (and optionally in addition to the nozzle characteristics described herein). Further, each of the plurality of nozzles (or ECUs 108) is optionally cycled, such as on/off, according to the location of the nozzle (or location of a nozzle group or ECU 108) relative to a frame of reference, such as a field.

In an example, each nozzle ECU 108 is programmable to receive, track, or modify designated nozzle control factors (e.g., flow rate, the related specified duty cycle, the actual duty cycle, or the like). For example, each ECU 108 monitors one or more of nozzle spacing, target flow rate for the system or for the nozzle(s) controlled by the ECU, target pressure for the system, speed of the agricultural sprayer, yaw rate, nozzle location on the field, or the like. Such examples provide the benefit of comporting the system to user specifications, provide greater programmability of the system, and providing cost effective nozzle specific flow rate and pressure solutions (e.g., through modification of valve duty cycles). In yet another example, the ECUs 108 associated with each nozzle are instead consolidated into one or more centralized nodes that determine (e.g., monitor or calculate) one or more of actual flow rate, actual pressure or the like of each of the respective nozzles in a similar manner to the previously described ECUs 108 associated with each of the nozzles.

The controllers 116 (e.g., the ECUs 108, the master node 110, or the like) control the nozzle flow rate (or the timing of flow through the nozzle) based on a number of parameters, including, but not limited to: speed of the sprayer or boom, yaw rate, target system flow rate (e.g., volume/area), target system pressure, and on/off command at runtime. Such parameters permit the controllers 116 to calibrate the duty cycle curve (e.g., by adjusting the actual duty cycle of a valve) of each smart nozzle needed to achieve one or more of the target nozzle flow rate, system target flow rate, system pressure, nozzle pressure, target nozzle timing of each of the smart nozzles. For instance, calibrating the duty cycle curve includes guiding an actual duty cycle of the nozzles (and their associated valves) to a specified duty cycle of the nozzles. The specified duty cycle corresponds to one or more of a target flow rate, target pressure (combination of both) or the like. Each smart nozzle is further configured according to nozzle spacing on the boom, location on the boom, and nozzle type. Further, in some examples, each smart nozzle regulates or controls the nozzle flow rate (or pressure) based on the location of the nozzle in the field (as described above). The controllers 116 can further control the timing (e.g., phase delay and time delays) for valve actuation as discussed herein.

As described herein, the agricultural sprayer 100 (shown in FIG. 1) includes a nozzle control system including a plurality of nozzles 106 having one or more associated valves 304 (e.g., such as a PWM solenoid valve as shown in FIG. 3, or the like) that regulate flow in order to provide a specified target application of an agricultural product from the nozzles 106. As a plurality of nozzles 106 are used across the boom 104 (shown in FIG. 1), achieving specified flow performance for each of the nozzles 106 enhances application precision and accuracy while minimizing application errors (e.g., misapplication, underapplication, overapplication, or the like). In some examples, one or more factors cause inconsistency in nozzle flow and droplet size (e.g., the size of droplets of agricultural product dispensed by the nozzle 106) of the sprayed agricultural product. Examples of these factors include, but are not limited to voltage drop of a solenoid drive voltage due to chassis wiring resistance, manufacturing tolerances of the mechanical elements in a valve itself (e.g., the valve 304, shown in FIG. 3), valve wear, valve contamination from the agricultural product, pressure variations across the boom or boom sections, variation due to an installed tip on the outlet of the nozzle, or open-stroke and close-stroke transition times for a moveable valve operator within the valve 304 controlling flow to the nozzle 106.

Figure 4:
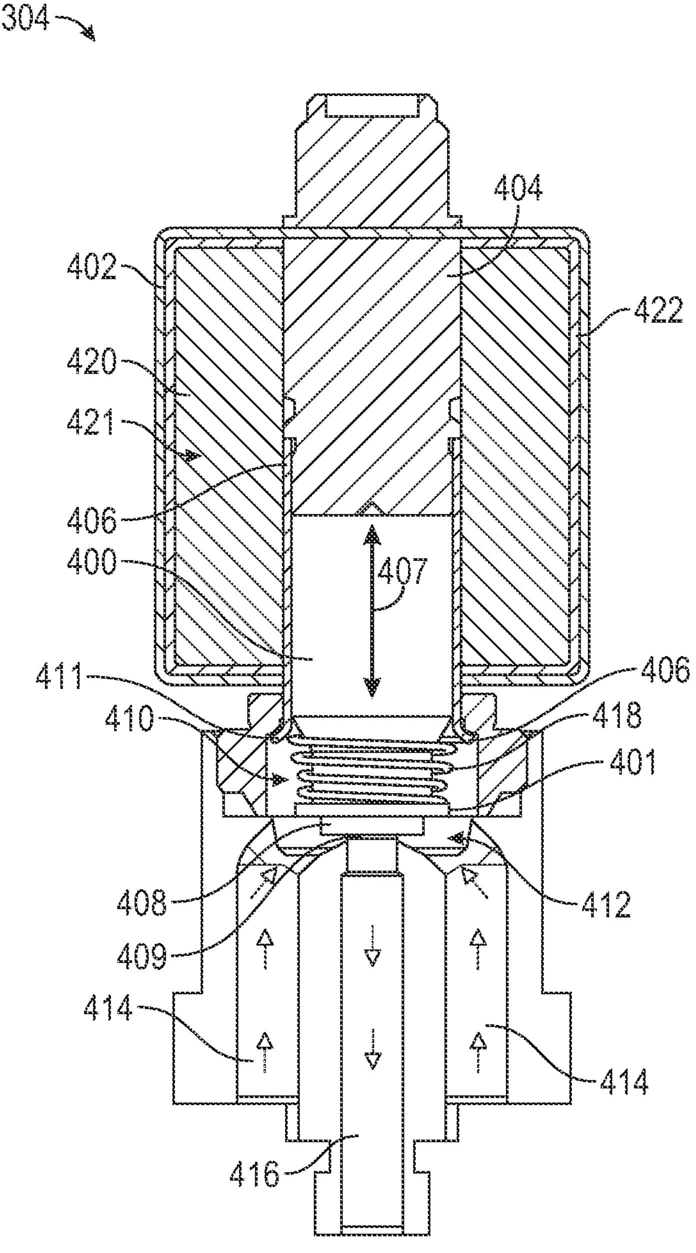
FIG. 4 illustrates an example of a valve, according to an embodiment of the present subject matter.
Figure 5:
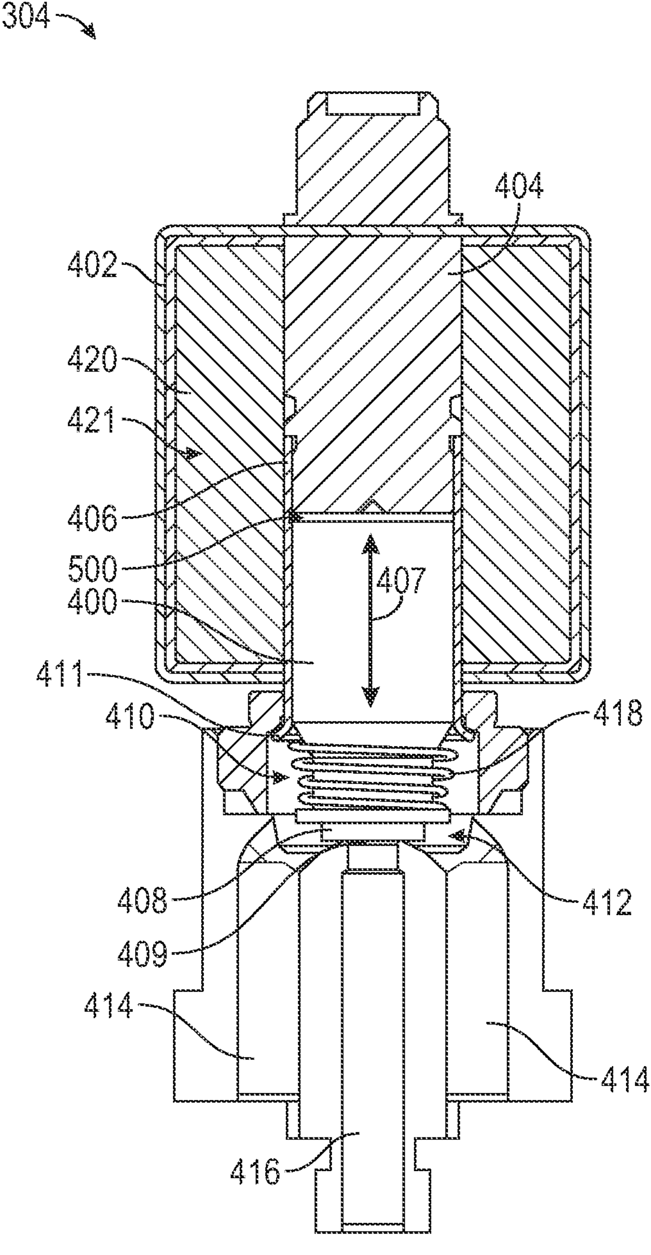
FIG. 5 illustrates an example of a valve, according to an embodiment of the present subject matter.

FIG. 4 and FIG. 5 illustrate sectional views of an example of the valve 304 in an open position and a closed position, respectively. The valve 304 is optionally a solenoid valve, for instance an electro-mechanical device that opens and closes an orifice by moving a moveable valve operator 400 (e.g., a poppet, gate, or the like) in a valve body 402 (e.g., a pressure vessel, frame, or the like). In an example, the valve body 402 of the valve 304 contains a lug 404 (e.g., a ferromagnetic material) and a housing 406 (e.g., a non-ferromagnetic material) that is connected to the lug 404. The valve operator 400 is movable in the housing 406, for instance with a range of motion 407 to open and close the valve. The valve operator 400 includes a seal 408 (e.g., a gasket, membrane or the like) coupled with a first end 410 of the valve operator 400. In an example, movement of the valve operator 400 within the housing 406 selectively opens and closes a channel 412 between a valve inlet 414 and a valve outlet 416. For example, the seal 408 engages with a valve seat 409 (shown in the closed configuration in FIG. 5) thereby inhibiting flow through the channel 412. In the open position, the seal 408 is disengaged from the seat 409 (as shown in FIG. 4) thereby allowing flow through the channel 412 (e.g., because the valve operator 400 is moved away from the seat 409). FIG. 4 includes arrows indicating flow within the valve inlet 414 and the valve outlet 416.

Figure 6:
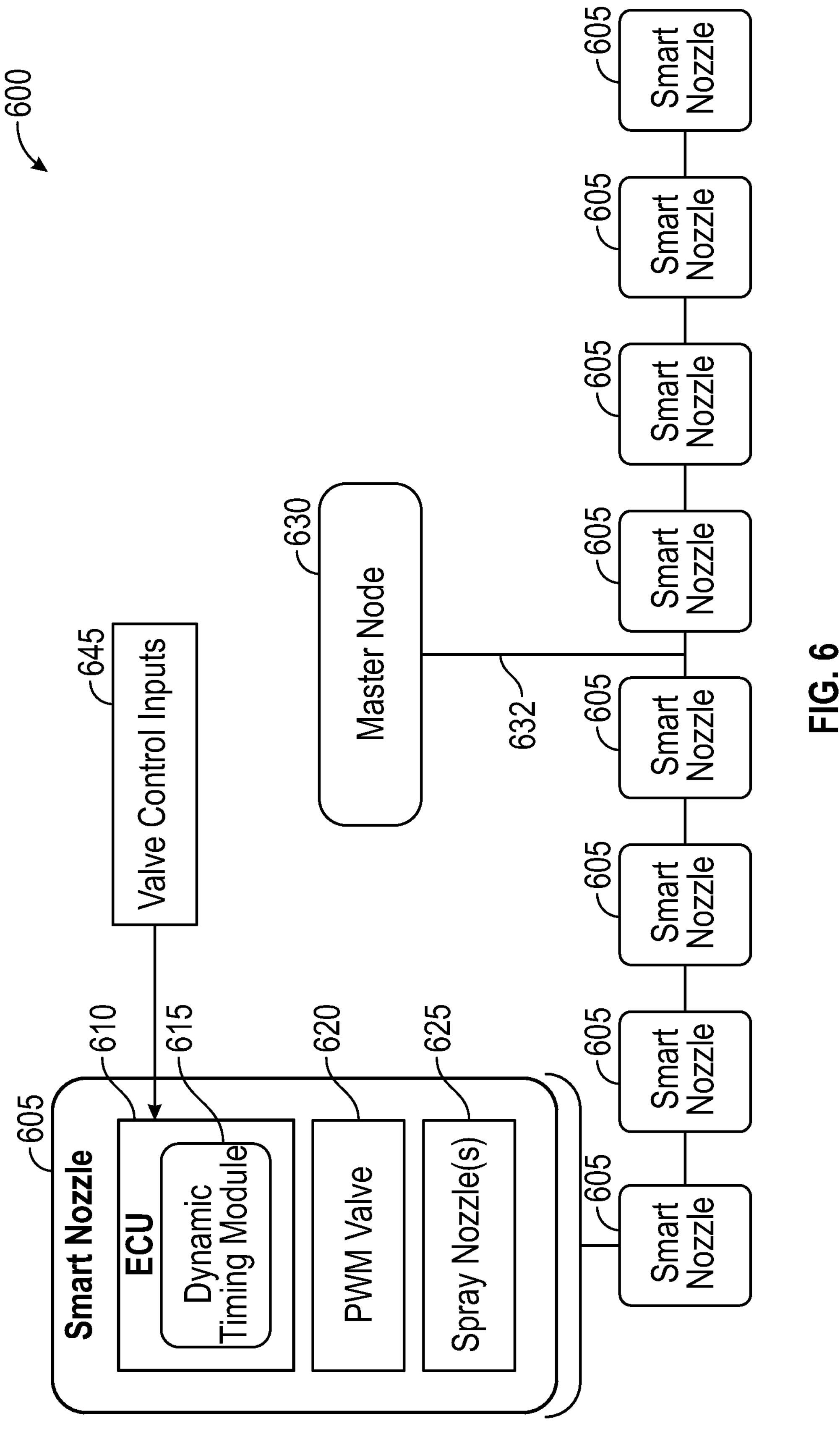
FIG. 6 illustrates an example control system, according to an embodiment of the present subject matter.

FIG. 6 illustrates an example sprayer control system 600 in accordance with an embodiment of the present subject matter. The control system 600 includes a plurality of smart nozzles 605 for mounting on a boom of an agricultural machine (not shown). Each of the smart nozzles 605 can include an ECU 610, a pulse width modulated (PWM) valve 620 and one or more spray nozzles 625, as illustrated with the smart nozzle 605 on the left. The control system 600 can further include a master node 630 in communication with the ECUs 610, all of which can communicate over a can bus 632. The ECUs 610 and master node 630 generally form a processing system 640 that can regulate the supply of agricultural product to the smart nozzles 605. The master node 630 can control a hydraulic valve that controls a pump to control system pressure.

Each ECU 610 includes a dynamic actuation timing module 615. In other examples, a dynamic timing module for a smart nozzle 605 can reside on the master node 630 or the functionality of a timing module can be distributed between the master node 630 and each ECU 610. The dynamic actuation timing module 615 for each smart nozzle 605 can receive multiple valve control inputs 645 and, using the inputs 645, can dynamically determine an actuation time for actuating its respective valve 620. The ECU 610 can at the actuation time provide actuation signal to the valve 620 to actuate the valve 620. As will be discussed in more detail below, determining the actuation time can include dynamically determining a base frequency (or cycle time) and optionally a phase offset for a valve 620. The base frequency can be determined and adjusted based on valve control inputs of a duty cycle for the valve 620 and/or a speed associated with the valve 620 (e.g., a speed value for the smart nozzle 605). By allowing each ECU 610 to adjust its base frequency based on its duty cycle and/or speed, frequencies can be lowered while maintaining adequate product coverage.

Figure 7:
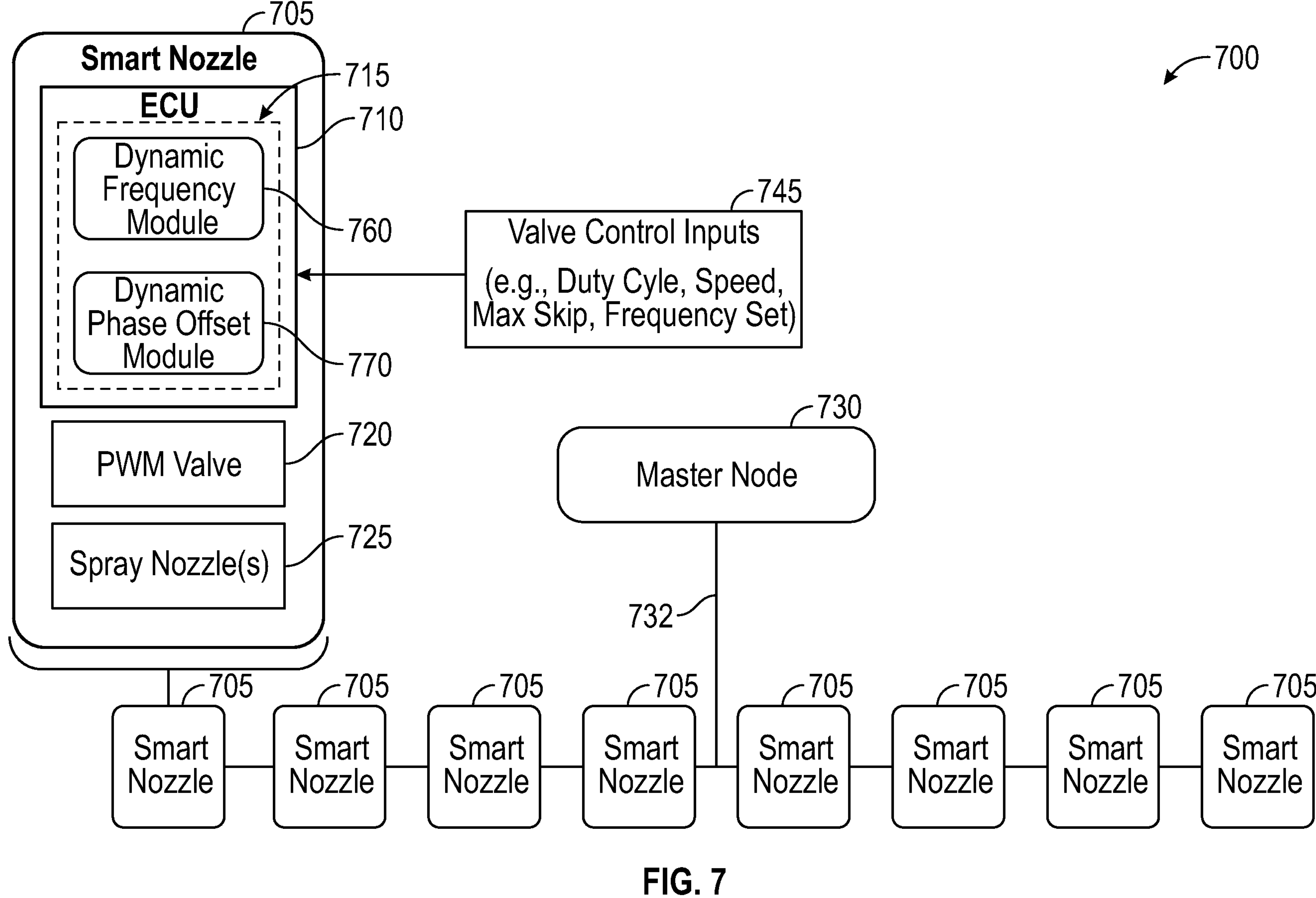
FIG. 7 illustrates another example control system, according to an embodiment of the present subject matter.

FIG. 7 illustrates an example control system 700 in accordance with an embodiment of the present subject matter. The control system 700 includes a master node 730 and multiple smart nozzles 705 each having an ECU 710, a PWM valve 720 and one or more spray nozzles 725. These components can be similar to those described above with regard to FIG. 6. Each ECU 710 of the control system 700 further includes a dynamic timing module 715 that includes a dynamic frequency module 760 and an optional dynamic phase offset module 770. In other example, the functionality of a timing module 712 can reside on the master node 730 or be distributed between the master node 730 and the ECUs 710. For example, the master node 730 can include a dynamic frequency module and a dynamic phase offset module that determine base frequencies and phase offsets for one or more of the smart nozzles 705 can communicate them to the nozzle ECUs 710. The timing module 715 for each smart nozzle 705 receives multiple valve control inputs 745 and uses these inputs to determine a base frequency and phase offset for the smart nozzle's respective valve 720, as will be explained below. For a respective smart nozzle 705, valve control inputs 745 can be received from the master node 730, other smart nozzle ECUs 710, or other modules residing on the ECU 710 of the respective smart nozzle 705.

The valve control inputs 745 for a given smart nozzle 705 can include one or both of a duty cycle for the smart nozzle's valve 720 and a speed value for the smart nozzle 705. The duty cycle can be a user-set or factory-set value or can be a dynamically determined value (e.g., by a master node or smart nozzle ECU) based on system or vehicle operating characteristics including the speed of the boom or the smart nozzle as discussed above, for example. The speed value can, for example, be a speed value representing the speed of the smart nozzle 705 or a speed of a boom (not shown). The speed value can be based on one or more of a GPS sensor, a radar sensor, a yaw sensor, etc. and can be a velocity.

The dynamic frequency module 760 can dynamically determine a base frequency (or cycle time) for its respective valve 720 using one or more of the valve control inputs 745. For example, the dynamic frequency module 760 for a valve 720 can determine the valve's frequency based on the valve's duty cycle and speed value and an optimization input such as a maximum skip value and/or maximum double coverage value. A maximum skip value can, e.g., specify a maximum skip distance or skip area in coverage. A maximum double coverage value can, e.g., specify a maximum amount of double coverage (e.g., spray overlap). In some examples, both a maximum skip value and a maximum coverage value can be used with the dynamic frequency module 760 determining a base frequency as a function of both values (e.g., the lowest frequency that satisfies both being below a maximum amount of skip and a maximum amount of double coverage).

In one example, the valve control inputs 745 for a given smart nozzle 705 include a skip input from a user (or a factory setting) specifying a maximum skip value threshold (e.g., a maximum skip distance or area) allowed during operation. The frequency module 760 in this example can calculate a skip value (e.g., area or distance) indicative of a skip in coverage of the liquid agricultural product and adjust the base frequency based on the calculated skip value and maximum skip value threshold. For example, the frequency module 760 can adjust the base frequency by selecting the base frequency from a set of specified frequencies, the selected base frequency being the lowest frequency of the set of specified frequencies for which the calculated skip value does not exceed the maximum skip threshold value. The set of frequency can be specified as multiples of two. For example, a set of frequencies can be 5 Hz, 10 Hz, 20 Hz or can be 7.5 Hz, 15 Hz, 30 Hz.

In one example, the valve control inputs 745 for a given smart nozzle 705 include a double coverage input from a user (or a factory setting) specifying a maximum double coverage threshold (e.g., a maximum amount of double coverage) allowed during operation. The frequency module 760 in this example can calculate a double coverage value (e.g., area of double coverage) indicative of double coverage of the liquid agricultural product and adjust the base frequency based on the calculated double coverage value and maximum double coverage value threshold. For example, the frequency module 760 can adjust the base frequency by selecting the base frequency from a set of specified frequencies, the selected base frequency being the lowest frequency of the set of specified frequencies for which the calculated double coverage value does not exceed the maximum threshold value. The set of frequency can be specified as multiples of two. For example, a set of frequencies can be 5 Hz, 10 Hz, 20 Hz or can be 7.5 Hz, 15 Hz, 30 Hz.

The frequency module 760 can calculate a skip area value or a double coverage value based on nozzle spray width, nozzle spacing, effective nozzle velocity, nozzle tip angle, duty cycle, and frequency. The frequency module 760 can calculate a skip distance value using effective nozzle velocity ($V_{Neff}$), duty cycle and frequency (f). For example, at duty cycles less than 50%, a skip distance value can be determined using the following formula:

$$\text{Skip Distance}=(V_{Neff}*(1-(\text{duty cycle}/100))/f$$

In the above calculations, the nozzle spray width generally represents the width of the spray from a nozzle. It can be a factory or user-set value or can be dynamically determined, e.g., based on a height of the nozzle (e.g., a height relative to a crop or relative to a baseline). The nozzle spray width is another valve control input in this example. The effective nozzle velocity generally represents a speed or velocity of the nozzle. It can be determined in a variety of ways, including using one or more of a GPS sensor, radar sensor, ultrasonic sensor, yaw sensor, boom angle sensor, and the location of the nozzle on the boom.

Figure 8:
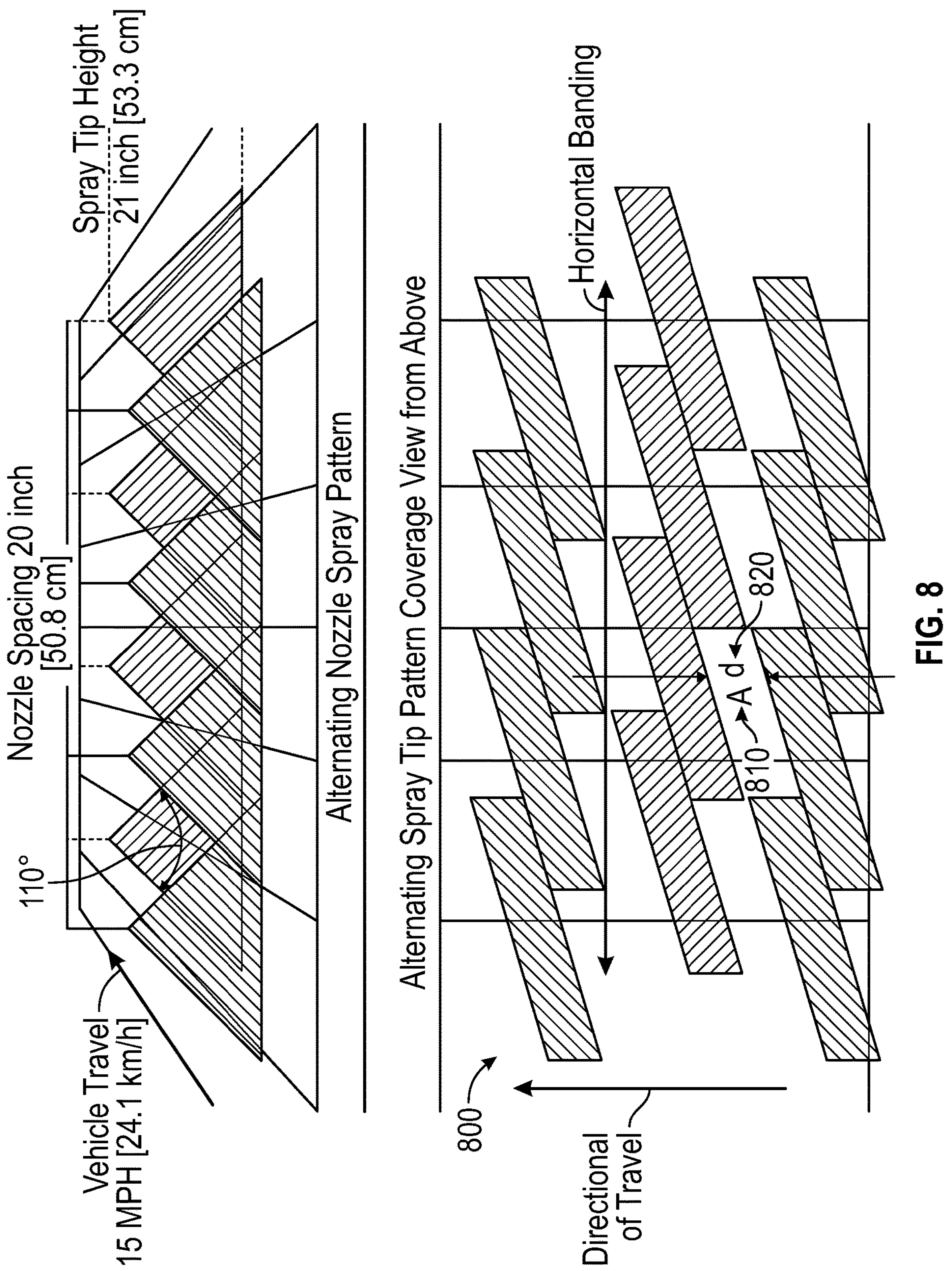
FIG. 8 illustrates an example of skips in coverage for a set of nozzles.
Figure 9:
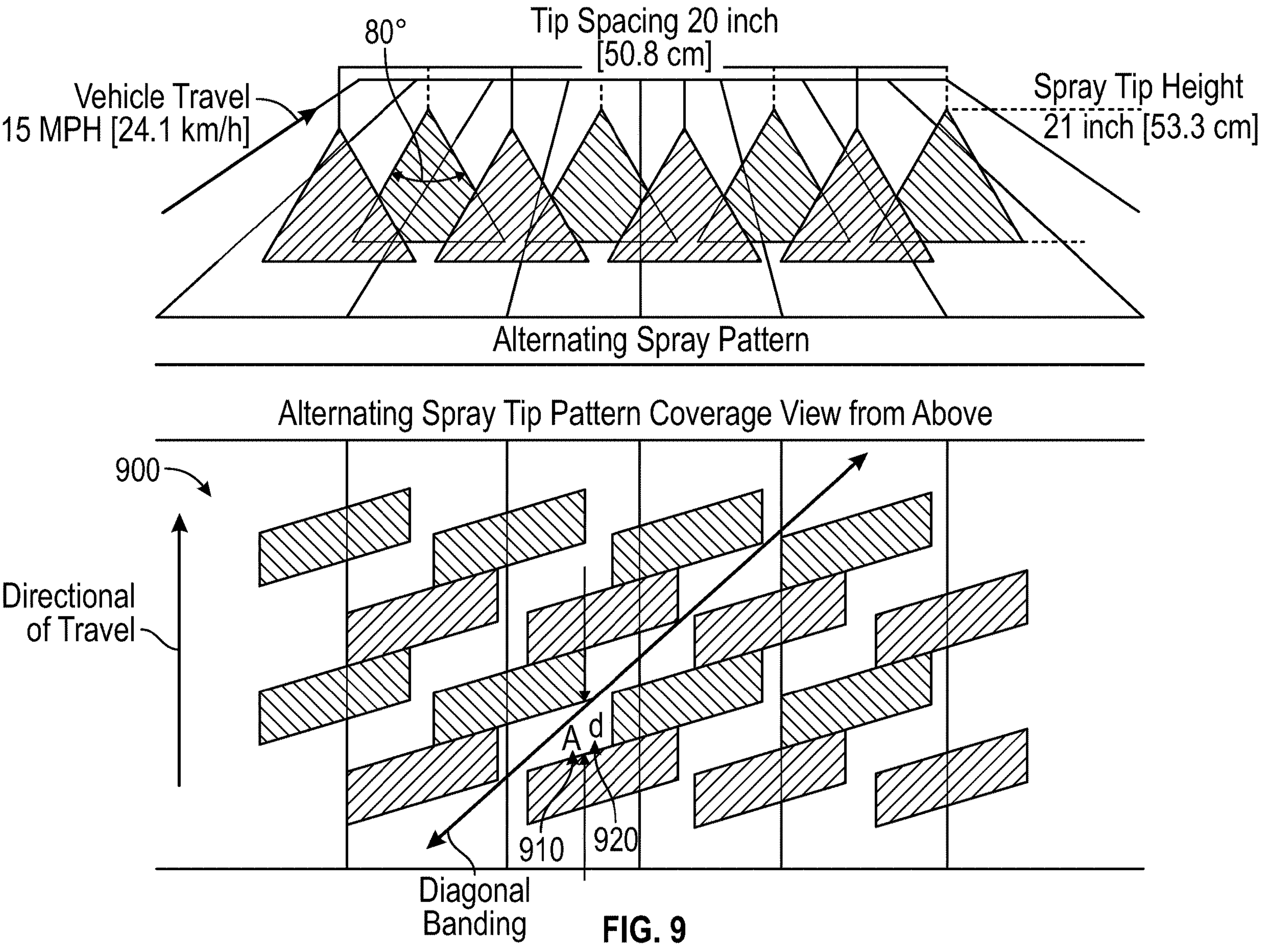
FIG. 9 illustrates another example of skips in coverage for a set of nozzles.

FIGS. 8 and 9 illustrate examples of skips in coverage that can result in horizontal or diagonal banding. The nozzles can be angled relative to the boom to product an angled spray pattern. In FIG. 8, the spray coverage 800 by the nozzles results in a skip area (A) 810 and skip distance (d) 820. In FIG. 9, the spray coverage 900 by the nozzles results in (A) 910 and skip distance (d) 920. Using the techniques described herein, an ECU for a nozzle can compare a calculated value (e.g., skip area or distance and/or double coverage) to a threshold value(s) and increase or decrease the base frequency for actuating its valve accordingly. For example, if a calculated skip area or distance exceeds the threshold, the ECU can select the next highest frequency that results in a calculated skip area or distance that does not exceed the threshold. Or, if a calculated skip area or distance is below a max skip threshold, the ECU can determine if a lower base frequency is available where the calculated skip area or distance still falls below the threshold and if so, use the lower base frequency.

In another example, the frequency module 760 can determine the base frequency based on the duty cycle by selecting the base frequency from a set of specified frequencies, each of the specified frequencies corresponding to a particular duty cycle or duty cycle range. The set of frequency can be specified as multiples of two. For example, a set of frequencies can be 5 Hz, 10 Hz, 20 Hz or can be 7.5 Hz, 15H, 30 Hz. Tables of example duty cycles and frequencies is illustrated below.

TABLE 1

| Base Frequency | Duty Cycle Range |
|---|---|
| 5 Hz | 5-95% |
| 10 Hz | 10-90% |
| 20 Hz | 20-80% |

TABLE 2

| Base Frequency | Duty Cycle Range |
|---|---|
| 7.5 Hz | 7.5-92.5% |
| 15 Hz | 15-85% |
| 30 Hz | 30-70% |

The frequency module 760 can be configured to change from a first base frequency (corresponding to a first duty cycle range) to a second base frequency (corresponding to a second duty cycle range) if the duty cycle for the associated smart nozzle 705 exceeds the first duty cycle range by a percentage threshold. For example, the frequency module 760 can set a frequency of 5 Hz while operating in 5-95% duty cycle range and adjust the base frequency to 10 Hz to decrease the skip distance.

Using the above techniques, the frequency module 760 can change the base frequency of its respective valve 720 to a higher frequency when the duty cycle is changed to a lower duty cycle and change the base frequency to a lower frequency when the duty cycle is changed to a higher duty cycle. The frequency module 760 is typically configured to use frequencies that are multiples of two of one another to aid in transitioning between frequencies. The frequency module 760 can however be implemented using a continuous frequency change if desired. Using multiples of two is advantageous, since a continuous frequency change (such as 10 Hz to 9 Hz) can however result in intervals of alignment and misalignment of valve actuations (in adjacent valves) and result in poor (e.g., over or under) coverage of the agricultural product.

As noted above, the timing module 715 can include a dynamic phase offset module 770. The dynamic phase offset module 770 can dynamically determine a phase offset for its respective valve 720 using one or more valve control inputs 745. The ECU 710 can then send a signal to actuate its valve 720 based on the base frequency modified by the phase offset. The dynamic phase offset module 770 can, in some examples, dynamically determine one or more component phase offsets and base the phase offset (e.g., a total phase offset) of the component phase offsets. For example, the phase offset can be the sum of the component phase offsets. The one or more component phase offsets can include a first component phase offset based on the nozzle mounting location, a second component phase offset based on boom yaw, a third component phase offset based on the nozzle open time, a fourth component phase offset based on nozzle groupings, and a fifth component phase offset associated with subgroup offsets (e.g., based on the total number of valves or a speed value and a set distance). The valve control inputs 745 for a given smart nozzle 705 can further include the nozzle mounting location (e.g., a mounting location of a smart nozzle relative to a centerline on the boom, etc.), a boom yaw measurement value (e.g., a yaw rate) and nozzle location, the speed value (e.g., a maximum speed, a speed of the nozzle or a speed of the boom), the total number of nozzles, the set distance, a processing delay time and an open time variation of the nozzle.

The dynamic phase offset module 770 can determine a phase offset based on nozzle mounting location. For example, the valve control inputs 745 can further include a horizontal mounting position and vertical mounting position (e.g., a location or offset distance relative to a fixed line) of each nozzle 705, and the dynamic phase offset module 770 can determine a phase offset based on the horizontal and vertical positions and the speed of the smart nozzle 705 and optionally the spray characteristics of the smart nozzle 705. For example, a phase offset can be determined based on the horizontal offset of the smart nozzle 705 and the speed of the smart nozzle 705 so that that smart nozzle 705 applies product at the same or near same geographical area but earlier or later in time than adjacent nozzles 705. As another example, a phase offset can be determine based on the vertical offset of the smart nozzle 705 and the spray characteristics (e.g., spray velocity) of the smart nozzle 705. For example, if all of the smart nozzles 705 sprayed at the same velocity, a nozzle 705 which is vertically higher (or lower) than an adjacent nozzle 705 can have a negative (or positive) phase offset relative to the adjacent nozzle 705. In this way, a higher mounted spray nozzle 705 can have a negative phase offset component based on mounting location and actuate sooner in time so that the two nozzles 705 spray the same geographical area.

The dynamic phase offset module 770 can determine a phase offset based on a boom yaw measurement. The boom yaw measurement can be a yaw rate or yaw angle determined by a yaw sensor and can be a valve control input 745. From the yaw measurement and location of the smart nozzle 705 on the boom, the dynamic phase offset module 770 can determine a height of the nozzle 705 (e.g., relative to crop, ground, or another nozzle) and determine a negative or positive phase offset for the nozzle 705. In this way, nozzles 705 higher from the crop can have a negative phase offset to actuate sooner and nozzles that are closer to the crop can have a positive phase offset to actuate later in time.

The dynamic phase offset module 770 can determine a phase offset based on the nozzle open time. For an individual smart nozzle 705, nozzle open time represents the time between a signal to open its valve 720 and when the valve 720 finishes opening. The nozzle open time can vary between nozzles 705. The phase offset module 770 for a smart nozzle 705 can receive a valve control input 745 of the open time for its valve 720 and determine a phase offset based on the open time.

The dynamic phase offset module 770 can also determine a phase offset based on nozzle groupings. For example, a set of smart nozzles 705 can be divided into groups with each group having a phase offset relative to another group. For example, the nozzles on a boom can be divided into two groups, one having a 0 degree phase offset and the other a 180 degree phase offset, or the nozzles can be divided into three groups, a first group having a 0 degree phase offset, a second group having a 120 degree offset and a third group have a 240 degree phase offset. The dynamic phase offset module 770 can further determine a subgroup phase offset associated with each nozzle group. For example, the phase offset module 770 can determine a phase offset separating actuation of adjacent valves in a group by a time delay so that the actuation of adjacent valves is spread out over time and power demands on the system are reduced. The time delay can, as examples, be determined by dividing the cycle time by the total number of valves in the group or on the whole system or be determined based on one or more vehicle speed values, a set distance, and the total number of the valves. This is discussed in more detail in U.S. Provisional Application Ser. No. 63/215,733, "Valve Control Systems and Methods.".

The tables below illustrate a simplified example of valve control inputs, base frequencies, and phase offsets for a set of twelve smart nozzles in accordance with an embodiment of the present subject matter. It should be appreciated that the table is provided by way of example and not limitation. A control system can include many more smart nozzles and other valve control inputs, and, during operation, the valve control inputs can vary as can the determined base frequencies and phase offsets. Other phase offsets that can be determined include offset based on nozzle grouping and subgrouping, and an offset based on open time, as examples.

TABLE 3

| Nozzle | Base Freq. | Mounting Offset (us) | Yaw Offset (us) | Total Phase Offset (us) | Actuation Time (us) |
|---|---|---|---|---|---|
| 1 | 5 Hz | 0 | −25 | −25 | 1/5 Hz − 25 |
| 2 | 5 Hz | 0 | −20 | −20 | 1/5 Hz − 20 |
| 3 | 5 Hz | 0 | −15 | −15 | 1/5 Hz − 15 |
| 4 | 5 Hz | 0 | −10 | −10 | 1/5 Hz − 20 |
| 5 | 10 Hz | −20 | −5 | −25 | 1/10 Hz − 25 |
| 6 | 10 Hz | 0 | 0 | 0 | 1/10 Hz |
| 7 | 10 Hz | 0 | 0 | 0 | 1/10 Hz |
| 8 | 10 Hz | −20 | 5 | −15 | 1/10 Hz − 15 |
| 9 | 20 Hz | 0 | 10 | 10 | 1/20 Hz + 10 |
| 10 | 20 Hz | 0 | 15 | 15 | 1/20 Hz + 15 |
| 11 | 20 Hz | 0 | 20 | 20 | 1/20 Hz + 20 |
| 12 | 20 Hz | 0 | 25 | 25 | 1/20 Hz + 25 |

With reference to the above table, each smart nozzle 1-12 can include an ECU with a dynamic frequency module and a dynamic phase offset module for determining its base frequency and various phase offsets. Nozzles 1-4 can be located on a boom on an inside turn and traveling at a slower speed. As a result, their ECUs can each determine a lower base frequency of 5 Hz based on their speed and duty cycle. Nozzles 9-12 can be located on the outside portion of the boom during a turn, traveling at a higher speed and can determine a higher base frequency. Similarly, the centrally located nozzles 5-8 can determine a base frequency in between. Each nozzle ECU also determines a phase offset associated with the mounting location of the nozzle. For example, an ECU can receive inputs of a horizontal and vertical offset of the nozzle relative to a boom centerline or other fixed location and determine a mounting phase offset from the inputs. In the example, above, nozzles 5 and 8 are offset from the centerline and determine a negative phase offset for their respective valves. A negative phase offset can result from a nozzle being positioned higher or forward of a centerline, for example. Each nozzle ECU can also determine a phase offset associated with boom yaw and thereby compensate for varying height of a nozzle relative to the crop or ground. For example, using a boom yaw measurement (e.g., rate or angle) and location of the nozzle along the boom, a nozzle ECU can determine a height of the nozzle and determine a phase offset based on the height. For example, a higher nozzle can determine a negative phase offset due to yaw when it is higher than a centerline. This can, e.g., allow the nozzle to actuate sooner to allow spray to reach the crop at a similar time as a nozzle at a lower height. Similarly, a lower nozzle can determine a positive phase offset due to yaw when it is lower than a centerline. This can, e.g., allow the nozzle to actuate later to allow spray to reach the crop at a similar time as a nozzle at a higher height. The table above corresponds to a boom tilting so that nozzles 1-5 have a higher height due to yaw and thus a negative offset to compensate, and nozzles 8-12 have a lower height and thus a positive offset. Nozzles 6 and 7 sit near the center of the boom at or near the centerline and have no phase offset based on yaw in this example. As illustrated in the last two columns, each nozzle ECU can determine a total phase offset (e.g., a sum of the component phase offsets based on mounting location and yaw) and can determine an actuation time for its respective valve based on its base frequency and total phase offset.

Figure 10:
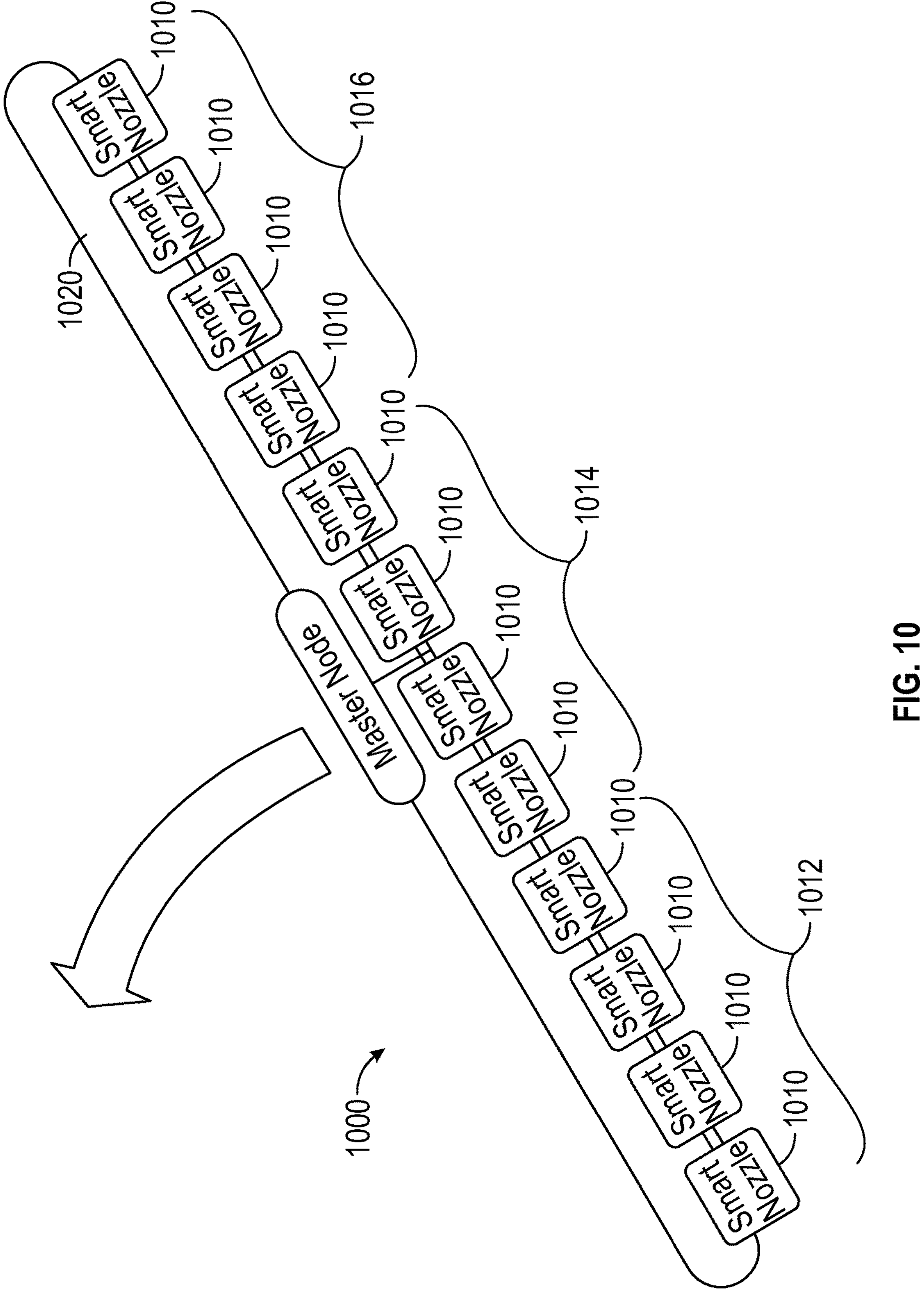
FIG. 10 illustrates another control system in accordance with an embodiment of the present subject matter.

FIG. 10 illustrates a control system 1000 in accordance with an embodiment of the present subject matter. The control system 1000 includes multiple smart nozzles 1010 mounted along a boom 1020 undergoing a turn. The boom 1020 can be connected to a vehicle (not shown). During the turn, the nozzles at the inside 1012 have lower speeds, the nozzles 1010 at the outside 1016 have higher speeds, and the nozzles in the middle 1014 have speeds in between the lower and higher speeds. Each smart nozzle 1010 operating with an ECU and a frequency module can dynamically determine the actuation time for its respective nozzle 1010 based on the speed of the nozzle using the techniques described above. In this example, assuming duty cycles across the boom are less than 50%, the ECU of an inside nozzle 1010 can determine a first base frequency (e.g., 7.5 Hz), the ECU of a middle 1014 nozzle 1010 can determine a second base frequency (e.g., 15 Hz) and the ECU of an outside 1016 nozzle 1010 can determine a third base frequency (e.g., 30 Hz). Each of the nozzle 1010 ECUs can then control the actuation time of its respective nozzle 1010 valve using its dynamically determined base frequency (which can be modified by a phase offset). In this way, during a common time, the nozzles operate at different frequencies as a function of speed. This enables lower speed nozzles (on the inside) to operate at a lower frequency while maintaining adequate coverage (e.g., avoiding too much skip).

Figure 11:
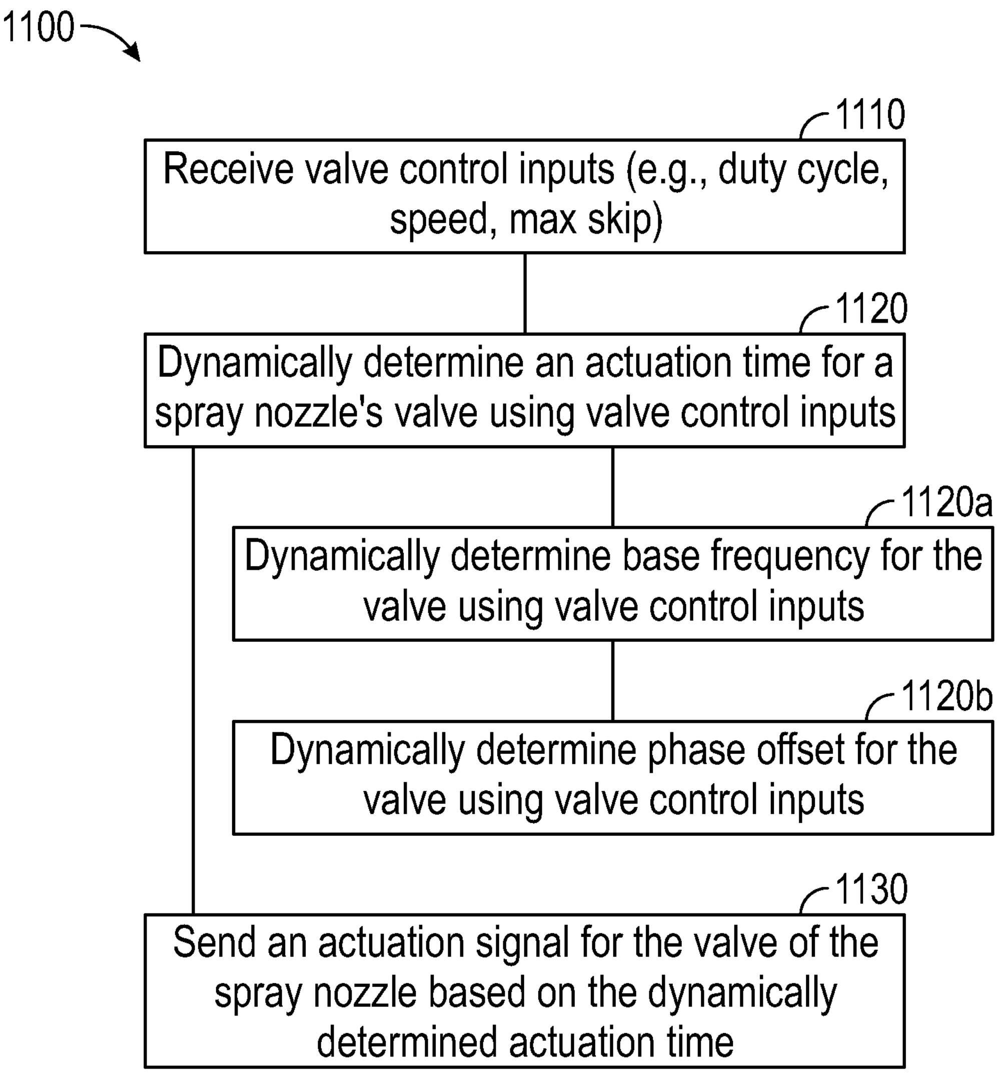
FIG. 11 illustrates an example control method, according to an embodiment of the present subject matter.

FIG. 11 illustrates a flowchart of a method 1100 for controlling a spray nozzle (e.g., a smart nozzle) according to examples of the present disclosure. Method 1100 can be performed by a processing system, such as a computing machine, associated with the spray nozzle (e.g., an ECU for the spray nozzle and/or a master node). At operation 1110, the processing system receives a plurality of valve control inputs. These inputs can be received from the master node or from ECUs of other smart nozzles over a can bus, for example. These inputs can also be received from other modules operating on the ECU associated with the spray nozzle. A wide variety of valve control inputs can be received, as discussed above.

At operation 1120, the processing system dynamically determines an actuation time for the spray nozzle's valve based on the plurality of valve control inputs. This can include determining a base frequency for the spray nozzle valve and optionally a phase offset for the valve, as illustrated at 1120*a*. A dynamic frequency module and a phase offset module can be provided on the processing system (e.g., on an ECU of a smart nozzle) to perform this operation. In one example, dynamically determining the actuation time includes dynamically determining a base frequency using one or more of a duty cycle and the speed value, both of which can be valve control inputs, as discussed above.

This operation 1120*a* can further include the processing system receiving, as a valve control input, one or more optimization inputs (e.g., specifying a maximum skip value threshold and/or a maximum double coverage value), calculating a skip value indicative of a skip in coverage of the liquid agricultural product and/or a double coverage value, and adjusting the base frequency based on the calculated skip value and/or double coverage value and the maximum skip value and/or double coverage thresholds. A skip value or double coverage value can be calculated as discussed in more detail above. In one example, adjusting the base frequency includes selecting the base frequency from a set of specified frequencies, the selected base frequency being the lowest frequency of the set of specified frequencies for which the calculated skip value and/or double coverage value does not exceed the maximum skip threshold value and/or double coverage threshold value. In another example, dynamically determining a base frequency based on the duty cycle includes selecting the base frequency from a set of specified frequencies, where each of the specified frequencies corresponds to a particular duty cycle or duty cycle range.

Optionally, at operation 1120*b*, the processing system can dynamically determine a phase offset for the spray nozzle. The phase offset can be dynamically determined using one or more valve control inputs such as the total number of valves, a set distance, a processing delay time, a nozzle mounting location, a boom yaw measurement, and a nozzle open time. The phase offset can be based on multiple subcomponents determine by a phase offset module or another component of the system. For example, a phase offset can be determined based on one or more (including all) of a first component phase offset based on the nozzle mounting location, a second component phase offset based on boom yaw, a third component phase offset based on the nozzle open time, a fourth component phase offset based on nozzle groupings, a fifth component phase associated with subgroup offsets. This is described in greater detail above.

At operation 1130, the processing system can send an actuation signal for a valve associated with the spray nozzle based on the dynamically determined actuation time. For example, an actuation signal can be sent to the valve at a time based on the base frequency modified by any phase offset. In operation, multiple spray nozzles (e.g., smart nozzles with ECUs) can be provided and the above method 1100 performed by each smart nozzle ECU to individually control the actuation time of its valve using a dynamic base frequency and/or dynamic phase offset.

Using multiple valve control inputs to dynamically determine an actuation time (e.g., by dynamically determining a base frequency and/or phase offset) for a valve, can allow for more accurate application of the agricultural product and better system performance. For example, the system can operate at lower frequencies while still minimizing or avoiding skips in coverage or double coverage of the product. As noted above, this can provide advantages such as reducing wear of the valves and/or reducing power consumption of the system.

Figure 12:
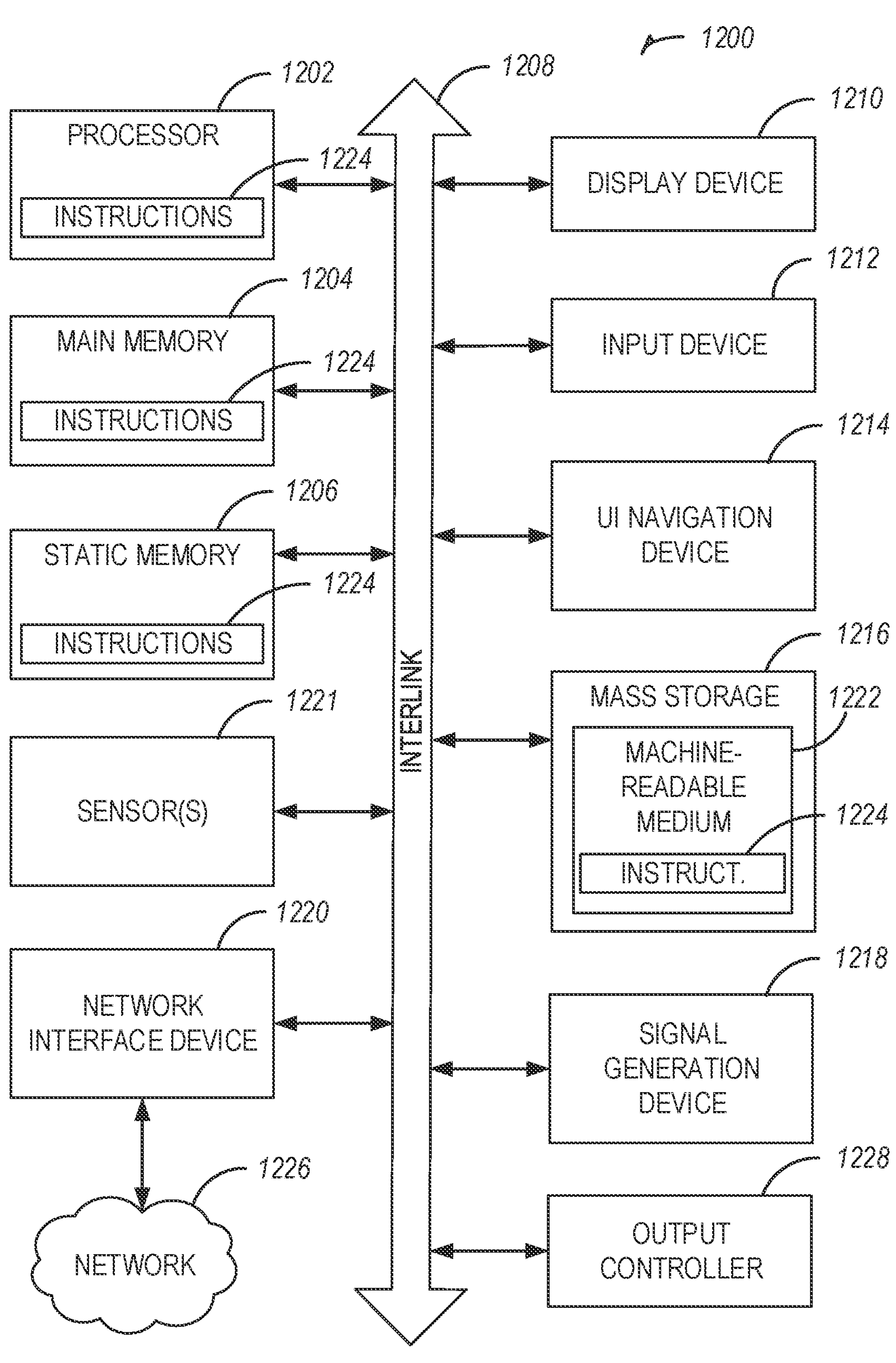
FIG. 12 is a block diagram illustrating an example of a machine upon which one or more embodiments may be implemented.

FIG. 12 illustrates a block diagram of an example machine 1200 (e.g., the controller 606, or the like) upon which any one or more of the techniques (e.g., methodologies) discussed herein may perform, for example one or more of the algorithms 801, 900, 1000, or 1100. Examples, as described herein, may include, or may operate by, logic or a number of components, or mechanisms in the machine 1200. Circuitry (e.g., processing circuitry) is a collection of circuits implemented in tangible entities of the machine 1200 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1200 follow.

In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1200 may include a hardware processor 1202 (e.g., a central processing unit (CPU), a graphics processing unit (GPU), a hardware processor core, or any combination thereof), a main memory 1204, a static memory (e.g., memory or storage for firmware, microcode, a basic-input-output (BIOS), unified extensible firmware interface (UEFI), etc.) 1206, and mass storage 1208 (e.g., hard drive, tape drive, flash storage, or other block devices) some or all of which may communicate with each other via an interlink (e.g., bus) 1230. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1208, a signal generation device 1218 (e.g., a speaker), a network interface device 1220, and one or more sensors 1216, such as a global positioning system (GPS) sensor, a yaw sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1202, the main memory 1204, the static memory 1206, or the mass storage 1208 may be, or include, a machine readable medium 1222 on which is stored one or more sets of data structures or instructions 1224 (e.g., software) embodying or utilized by any one or more of the techniques or functions described herein. The instructions 1224 may also reside, completely or at least partially, within any of registers of the processor 1202, the main memory 1204, the static memory 1206, or the mass storage 1208 during execution thereof by the machine 1200. In an example, one or any combination of the hardware processor 1202, the main memory 1204, the static memory 1206, or the mass storage 1208 may constitute the machine readable media 1222. While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may be further transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software. A transmission medium is a machine readable medium.

Various Notes & Aspects

Aspect 1 can include subject matter such as a sprayer control system for applying an agricultural product. The system can include a plurality of smart nozzles for mounting along a boom and a master node in communication with the ECUs. Each of the smart nozzles can include an electronic control unit (ECU), a control valve, and one or more spray nozzles. The master node and ECUs can include a processing system for regulating the supply of agricultural product to the plurality of smart nozzles. The processing system can include at least one dynamic actuation timing module configured to receive a plurality of valve control inputs for a respective control valve of a respective smart nozzle associated with the ECU and dynamically determine an actuation time for the respective control valve based on the plurality of valve control inputs.

Aspect 2 can include, or can optionally be combined with the subject matter of Aspect 1 to include, the dynamic determination of the actuation time including a dynamic determination of one or more of a base frequency and a phase offset for actuating the respective control valve.

Aspect 3 can include, or can optionally be combined with the subject matter of any one or more of Aspects 1 through 2, to include the plurality of valve control inputs including one or more of a duty cycle for the respective control valve and a speed value associated with the respective smart nozzle, and the dynamic actuation timing module including a dynamic frequency module configured to dynamically generate the base frequency using one or more of the duty cycle and the speed value.

Aspect 4 can include, or can optionally be combined with the subject matter of any one or more of Aspects 1 through 3, to include the frequency module receiving an optimization input, wherein the frequency module is configured to adjust the base frequency based on the optimization input.

Aspect 5 can include, or can optionally be combined with the subject matter of any one or more of Aspects 1 through 4, to include the optimization input including a skip input specifying a maximum skip value threshold. In this Aspect, the frequency module can be configured to: calculate a skip value indicative of a skip in coverage of the liquid agricultural product, and adjust the base frequency based on the calculated skip value and maximum skip value threshold.

Aspect 6 can include, or can optionally be combined with the subject matter of any one or more of Aspects 1 through 5, to include the optimization input including a coverage input specifying a maximum coverage threshold. In this Aspect, the frequency module can be configured to calculate a coverage value indicative of an area of double coverage of the liquid agricultural product, and adjust the base frequency based on the calculated coverage value and maximum skip coverage threshold.

Aspect 7 can include, or can optionally be combined with the subject matter of any one or more of Aspects 1 through 6, to include adjusting the base frequency including selecting the base frequency from a set of specified frequencies, the selected base frequency being the lowest frequency of the set of specified frequencies for which one or more of a calculated skip value and calculated coverage value does not exceed a threshold value.

Aspect 8 can include, or can optionally be combined with the subject matter of any one or more of Aspects 1 through 7, to include the frequency module configured to calculate one or more of a calculated skip value and calculated coverage value based on a nozzle spray width, a nozzle speed, the duty cycle, and the frequency.

Aspect 9 can include, or can optionally be combined with the subject matter of any one or more of Aspects 1 through 8, to include the frequency module configured to determine the base frequency based on the duty cycle by selecting the base frequency from a set of specified frequencies, each of the specified frequencies corresponding to a particular duty cycle or duty cycle range.

Aspect 10 can include, or can optionally be combined with the subject matter of any one or more of Aspects 1 through 9, to include the frequency module configured to change the base frequency to a higher frequency when the duty cycle is changed to a lower duty cycle and change the base frequency to a lower frequency when the duty cycle is changed to a higher duty cycle.

Aspect 11 can include, or can optionally be combined with the subject matter of any one or more of Aspects 1 through 10, to include the frequency module configured to change the base frequency so that the higher frequency and the lower frequency are related by a multiple of two.

Aspect 12 can include, or can optionally be combined with the subject matter of any one or more of Aspects 1 through 11, to include the plurality of valve control inputs including one or more of a total number of valves, a speed value, a set distance, a processing delay time, a nozzle mounting location, a boom yaw measurement, and a nozzle open time. In this Aspect, the dynamic actuation timing module can include a dynamic phase offset module that is configured to dynamically determine the phase offset using one or more of the total number of valves, the set distance, the processing delay time, the nozzle mounting location, the boom yaw measurement, and the nozzle open time.

Aspect 13 can include, or can optionally be combined with the subject matter of any one or more of Aspects 1 through 12, to include the dynamic determination of the phase offset including determining one or more component phase offsets, the phase offset being based on the one or more component phase offsets.

Aspect 14 can include, or can optionally be combined with the subject matter of any one or more of Aspects 1 through 13, to include the one or more component phase offsets including one or more of a first component phase offset based on the nozzle mounting location, a second component phase offset based on boom yaw, a third component phase offset based on the nozzle open time, a fourth component phase offset based on nozzle groupings, a fifth component phase offset associated with subgroup offsets.

Aspect 15 can include, or can optionally be combined with the subject matter of any one or more of Aspects 1 through 14, to include the plurality of valve control inputs including one or more of a duty cycle for the respective control valve and a first speed value. In this Aspect, the dynamic determination of the base frequency can include dynamically determining the base frequency using one or more of the duty cycle and the first speed value. The plurality of valve control inputs can include one or more of a total number of valves, a second speed value, a set distance, a processing delay time, a nozzle mounting location, a boom yaw measurement, and a nozzle open time. The second speed value and first speed value can be the same or different values. The dynamic determination of the phase offset can include dynamically determining the phase offset using one or more of the total number of valves, the second speed value, the set distance, the processing delay time, the nozzle mounting location, the boom yaw measurement, and the nozzle open time.

Aspect 16 can include, or can optionally be combined with the subject matter of any one or more of Aspects 1 through 15, to include the processing system further configured to determine a duty cycle for the respective control valve based on a speed value associated with the respective smart nozzle.

Aspect 17 can include, or can optionally be combined with the subject matter of any one or more of Aspects 1 through 16, to include the duty cycle being an applied duty cycle based on a specified duty cycle.

Aspect 18 can include, or can optionally be combined with the subject matter of any one or more of Aspects 1 through 17, to include the at least one dynamic actuation timing module including multiple dynamic timing modules each associated with a respective one of the smart nozzles.

Aspect 19 can include, or can optionally be combined with the subject matter of any one or more of Aspects 1 through 18, to include the plurality of smart nozzles including a first set of one or more smart nozzles mounted at a first end of the boom and a second set of one or more smart nozzles mounted at a second, opposite end of the boom. In this Aspect, during a common time, the first set of one or more smart nozzles can be configured to operate at a first frequency and the second set of one or more smart nozzles can be configured to at a second frequency different than the first frequency.

Aspect 20 can include, or can optionally be combined with the subject matter of any one or more of Aspects 1 through 19, to include the plurality of smart nozzles including a third set of one or more smart nozzles mounted at a middle location of the boom between the first and second sets of one or more smart nozzle. In this Aspect, during the common time, the third set of one or more smart nozzles can be configured to operate at a third frequency between the second frequency and the first frequency.

Aspect 21 can include subject matter such as a method for controlling a spray nozzle. The method can include: (i) receiving, by a processing system associated with the spray nozzle, a plurality of valve control inputs, (ii) dynamically determining, by the processing system, an actuation time for the spray nozzle based on the plurality of valve control inputs, and (iii) sending, by the processing system, an actuation signal for a valve associated with the spray nozzle based on the dynamically determined actuation time.

Aspect 22 can include, or can optionally be combined with the subject matter of Aspect 21, to include dynamically determining the actuation time including dynamically determining one or more of a base frequency and a phase offset for actuating the valve.

Aspect 23 can include, or can optionally be combined with the subject matter of any one or more of Aspects 21 through 22, to include the plurality of valve control inputs including one or more of a duty cycle for the respective control valve and a speed value associated with the respective smart nozzle. In this Aspect, dynamically determining the actuation time can include dynamically determining the base frequency using one or more of the duty cycle and the speed value.

Aspect 24 can include, or can optionally be combined with the subject matter of any one or more of Aspects 21 through 23, to include receiving a skip input specifying a maximum skip value threshold, calculating a skip value indicative of a skip in coverage of the liquid agricultural product, and adjusting the base frequency based on the calculated skip value and maximum skip value threshold.

Aspect 25 can include, or can optionally be combined with the subject matter of any one or more of Aspects 21 through 24, to include adjusting the base frequency including selecting the base frequency from a set of specified frequencies. In this Aspect, the selected base frequency can be the lowest frequency of the set of specified frequencies for which the calculated skip value does not exceed the maximum skip threshold value.

Aspect 26 can include, or can optionally be combined with the subject matter of any one or more of Aspects 21 through 25, to include calculating the skip value including calculating the skip value based on a nozzle spray width, a nozzle speed, the duty cycle, and the frequency.

Aspect 27 can include, or can optionally be combined with the subject matter of any one or more of Aspects 21 through 26, to include receiving a coverage input specifying a maximum double coverage value threshold, calculating a coverage value indicative of a double coverage of the liquid agricultural product; and adjusting the base frequency based on the calculated coverage value and maximum double coverage value threshold.

Aspect 28 can include, or can optionally be combined with the subject matter of any one or more of Aspects 21 through 27, to include adjusting the base frequency including selecting the base frequency from a set of specified frequencies. In this Aspect, the selected base frequency can be the lowest frequency of the set of specified frequencies for which the calculated coverage value does not exceed the maximum double coverage value threshold.

Aspect 29 can include, or can optionally be combined with the subject matter of any one or more of Aspects 21 through 28, to include calculating the coverage value including calculating the coverage value based on a nozzle spray width, a nozzle speed, the duty cycle, and the frequency.

Aspect 30 can include, or can optionally be combined with the subject matter of any one or more of Aspects 21 through 29, to include dynamically determining one or more of the base frequency and the phase offset including dynamically determining the base frequency based on the duty cycle by selecting the base frequency from a set of specified frequencies. In this Aspect, each of the specified frequencies can correspond to a particular duty cycle or duty cycle range.

Aspect 31 can include, or can optionally be combined with the subject matter of any one or more of Aspects 21 through 30, to include dynamically determining one or more of the base frequency and the phase offset including changing the base frequency to a higher frequency when the duty cycle is changed to a lower duty cycle and change the base frequency to a lower frequency when the duty cycle is changed to a higher duty cycle.

Aspect 32 can include, or can optionally be combined with the subject matter of any one or more of Aspects 21 through 31, to include the base frequency being changed so that the higher frequency and the lower frequency are related by a multiple of two.

Aspect 333 can include, or can optionally be combined with the subject matter of any one or more of Aspects 21 through 32, to include the plurality of valve control inputs including one or more of a total number of valves, a speed value, a set distance, a processing delay time, a nozzle mounting location, a boom yaw measurement, and a nozzle open time. In this Aspect, dynamically determining the actuation time can include dynamically determining the phase offset using one or more of the total number of valves, the set distance, the processing delay time, the nozzle mounting location, the boom yaw measurement, and the nozzle open time.

Aspect 34 can include, or can optionally be combined with the subject matter of any one or more of Aspects 21 through 33, to include dynamically determining the phase offset including determining one or more component phase offsets, the phase offset being based on the one or more component phase offsets.

Aspect 35 can include, or can optionally be combined with the subject matter of any one or more of Aspects 21 through 34, to include the one or more component phase offsets including one or more of a first component phase offset based on the nozzle mounting location, a second component phase offset based on boom yaw, a third component phase offset based on the nozzle open time, a fourth component phase offset based on nozzle groupings, a fifth component phase associated with subgroup offsets.

Aspect 36 can include, or can optionally be combined with the subject matter of any one or more of Aspects 31 through 35, to include the plurality of valve control inputs includes one or more of a duty cycle for the respective control valve and a first speed value. In this Aspect, dynamically determining the actuation time includes dynamically determining the base frequency using one or more of the duty cycle and the first speed value. The plurality of valve control inputs can include one or more of a total number of valves, a second speed value, a set distance, a processing delay time, a nozzle mounting location, a boom yaw measurement, and a nozzle open time. The second speed value and first speed value can be the same or different values. Dynamically determining the actuation time can include dynamically determining the phase offset using one or more of the total number of valves, the second speed value, the set distance, the processing delay time, the nozzle mounting location, the boom yaw measurement, and the nozzle open time.

Aspect 37 can include, or can optionally be combined with the subject matter of any one or more of Aspects 21 through 36, to include determining a duty cycle for the spray based on a speed value associated with the spray nozzle.

Aspect 38 can include, or can optionally be combined with the subject matter of any one or more of Aspects 31 through 37, to include the duty cycle being an applied duty cycle based on a specified duty cycle.

Aspect 39 can include, or can optionally be combined with the subject matter of any one or more of Aspects 21 through 38, to include performing the method being performed by each of multiple spray nozzles associated with a boom of an agricultural machine.

Aspect 40 can include, or can optionally be combined with the subject matter of any one or more of Aspects 21 through 39, to include the plurality of spray nozzles including a first set of one or more smart nozzles mounted at a first end of the boom and a second set of one or more smart nozzles mounted at a second, opposite end of the boom. In this Aspect, dynamically determining the base frequency can include, during a common time, determining a first frequency for the first set of one or more smart nozzles and a second frequency for the second set of one or more smart nozzles. The second frequency can be different than the first frequency.

Aspect 41 can include, or can optionally be combined with the subject matter of any one or more of Aspects 21 through 40, to include the plurality of spray nozzles including a third set of one or more smart nozzles mounted at a middle location of the boom between the first and second sets of one or more smart nozzles. In this Aspect, dynamically determining the base frequency can include, during the common time, determining a third frequency for the third set of one or more smart nozzles, the third frequency being between the second frequency and the first frequency.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A sprayer control system for applying an agricultural product, the system comprising:

a plurality of smart nozzles for mounting along a boom, wherein each of the smart nozzles includes an electronic control unit (ECU), a control valve, and one or more spray nozzles; and a master node in communication with the ECUs, the master node and ECUs comprising a processing system for regulating the supply of the agricultural product to the plurality of smart nozzles, the processing system comprising:

processing circuitry; and memory, including instructions, which when executed by the processing circuitry, cause the processing circuitry to perform operations including operations to:

receive a plurality of valve control inputs for a respective control valve of a respective smart nozzle associated with the ECU, wherein the plurality of valve control inputs includes one or more of a processing delay time or a boom yaw measurement;

dynamically determine an actuation time for the respective control valve based on the plurality of valve control inputs, wherein the dynamic determination of the actuation time includes a dynamic determination of a phase offset for actuating the respective control valve;

wherein the phase offset is dynamically determined using one or more of the processing delay time or the boom yaw measurement; and actuate the respective control valve using the dynamically determined actuation time.

2. The control system of claim 1, wherein the dynamic determination of the actuation time further includes a dynamic determination of one or more of a base frequency for actuating the respective control valve.

3. The control system of claim 2, wherein the plurality of valve control inputs includes one or more of a duty cycle for the respective control valve and a speed value associated with the respective smart nozzle; and wherein the processing circuitry further performs operations to dynamically generate the base frequency using one or more of the duty cycle and the speed value.

4. The sprayer control system of claim 3, wherein the processing system receives an optimization input, wherein the processing circuitry further performs operations to adjust the base frequency based on the optimization input.

5. The sprayer control system of claim 4, wherein the optimization input includes a skip input specifying a maximum skip value threshold, wherein the processing circuitry further performs operations to:

calculate a skip value indicative of a skip in coverage of the agricultural product; and adjust the base frequency based on the calculated skip value and the maximum skip value threshold.

6. The sprayer control system of claim 4, wherein the optimization input includes a coverage input specifying a maximum skip coverage threshold, wherein the processing circuitry further performs operations to:

calculate a coverage value indicative of an area of double coverage of the agricultural product; and adjust the base frequency based on the calculated coverage value and the maximum skip coverage threshold.

7. The sprayer control system of claim 4, wherein adjusting the base frequency includes selecting the base frequency from a set of specified frequencies, the selected base frequency being the lowest frequency of the set of specified frequencies for which one or more of a calculated skip value and calculated coverage value does not exceed a threshold value.

8. The sprayer control system of claim 4, wherein the processing circuitry further performs operations to calculate one or more of a calculated skip value and calculated coverage value based on a nozzle spray width, a nozzle speed, the duty cycle, and the base frequency.

9. The sprayer control system of claim 8, wherein the processing circuitry further performs operations to change the base frequency so that a higher frequency and a lower frequency are related by a multiple of two.

10. The sprayer control system of claim 2, wherein the processing circuitry further performs operations to determine the base frequency based on a duty cycle by selecting the base frequency from a set of specified frequencies, each of the specified frequencies corresponding to a particular duty cycle or duty cycle range.

11. The sprayer control system of claim 2, wherein the processing circuitry further performs operations to change the base frequency to a higher frequency when duty cycle is changed to a lower duty cycle and change the base frequency to a lower frequency when the duty cycle is changed to a higher duty cycle.

12. The control system of claim 2, wherein the plurality of valve control inputs includes one or more of a duty cycle for the respective control valve and a first speed value; and wherein the dynamic determination of the base frequency includes dynamically determining the base frequency using one or more of the duty cycle and the first speed value;

wherein the plurality of valve control inputs includes one or more of a total number of valves, a second speed value, a set distance, a processing delay time, a nozzle mounting location, a boom yaw measurement, and a nozzle open time; wherein the second speed value and the first speed value are the same or different values; and wherein the dynamic determination of the phase offset includes dynamically determining the phase offset using one or more of the total number of valves, the second speed value, the set distance, the processing delay time, the nozzle mounting location, the boom yaw measurement, and the nozzle open time.

13. The control system of claim 1, wherein the dynamic determination of the phase offset includes determining one or more component phase offsets, the phase offset being based on the one or more component phase offsets.

14. The control system of claim 1, wherein the processing system is further configured to determine a duty cycle for the respective control valve based on a speed value associated with the respective smart nozzle.

15. The control system of claim 14, wherein the duty cycle is an applied duty cycle based on a specified duty cycle.

16. The control system of claim 1, wherein the plurality of smart nozzles includes a first set of one or more smart nozzles mounted at a first end of the boom and a second set of one or more smart nozzles mounted at a second, opposite end of the boom, wherein, during a common time, the first set of one or more smart nozzles is configured to operate at a first frequency and the second set of one or more smart nozzles is configured to at a second frequency different than the first frequency.

17. The control system of claim 16, wherein the plurality of smart nozzles includes a third set of one or more smart nozzles mounted at a middle location of the boom between the first and second sets of one or more smart nozzle, wherein, during the common time, the third set of one or more smart nozzles is configured to operate at a third frequency between the second frequency and the first frequency.

18. A method for controlling a spray nozzle, comprising:

receiving, by a processing system associated with the spray nozzle, a plurality of valve control inputs for a respective control valve, wherein the plurality of valve control inputs includes one or more of a processing delay time or a boom yaw measurement;

dynamically determining, by the processing system, an actuation time for the spray nozzle based on the plurality of valve control inputs, wherein the dynamic determination of the actuation time includes a dynamic determination of a phase offset for actuating the respective control valve;

wherein the phase offset is dynamically determined using one or more of the processing delay time or the boom yaw measurement; and sending, by the processing system, an actuation signal for the respective control valve associated with the spray nozzle based on the dynamically determined actuation time; and actuating the respective control valve based on the actuation signal.

19. The method of claim 18, wherein dynamically determining the actuation time includes dynamically determining one or more of a base frequency for actuating the valve.

20. The method of claim 19, wherein the plurality of valve control inputs includes one or more of a duty cycle for the respective control valve and a speed value associated with the respective smart nozzle; and wherein dynamically determining the actuation time includes dynamically determining the base frequency using one or more of the duty cycle and the speed value.

21. The method of claim 20, further including:

receiving a skip input specifying a maximum skip value threshold;

calculating a skip value indicative of a skip in coverage of a liquid agricultural product; and adjusting the base frequency based on the calculated skip value and the maximum skip value threshold.

22. The method of claim 21, wherein adjusting the base frequency includes selecting the base frequency from a set of specified frequencies, the selected base frequency being the lowest frequency of the set of specified frequencies for which the calculated skip value does not exceed the maximum skip threshold value.

23. The method of claim 21, wherein calculating the skip value includes calculating the skip value based on a nozzle spray width, a nozzle speed, the duty cycle, and the base frequency.

24. The method of claim 20, further including:

receiving a coverage input specifying a maximum double coverage value threshold;

calculating a coverage value indicative of a double coverage of a liquid agricultural product; and adjusting the base frequency based on the calculated coverage value and the maximum double coverage value threshold.

25. The method of claim 24, wherein adjusting the base frequency includes selecting the base frequency from a set of specified frequencies, the selected base frequency being the lowest frequency of the set of specified frequencies for which the calculated coverage value does not exceed the maximum double coverage value threshold.

26. The method of claim 24, wherein calculating the coverage value includes calculating the coverage value based on a nozzle spray width, a nozzle speed, the duty cycle, and the frequency.

27. The method of claim 19, wherein dynamically determining one or more of the base frequency and the phase offset includes dynamically determining the base frequency based on a duty cycle by selecting the base frequency from a set of specified frequencies, each of the specified frequencies corresponding to a particular duty cycle or duty cycle range.

28. The method of claim 19, wherein dynamically determining one or more of the base frequency and the phase offset includes changing the base frequency to a higher frequency when a duty cycle is changed to a lower duty cycle and change the base frequency to a lower frequency when the duty cycle is changed to a higher duty cycle.

29. The method of claim 28, wherein the base frequency is changed so that the higher frequency and the lower frequency are related by a multiple of two.

30. The method of claim 19, wherein the plurality of valve control inputs includes one or more of a duty cycle for the respective control valve and a first speed value; and wherein dynamically determining the actuation time includes dynamically determining the base frequency using one or more of the duty cycle and the first speed value;

wherein the plurality of valve control inputs includes one or more of a total number of valves, a second speed value, a set distance, a processing delay time, a nozzle mounting location, a boom yaw measurement, and a nozzle open time; wherein the second speed value and the first speed value are the same or different values; and wherein dynamically determining the actuation time includes dynamically determining the phase offset using one or more of the total number of valves, the second speed value, the set distance, the processing delay time, the nozzle mounting location, the boom yaw measurement, and the nozzle open time.

31. The method of claim 30, further including performing the method of claim 30 by each of multiple spray nozzles associated with a boom of an agricultural machine.

32. The method of claim 31, wherein the plurality of spray nozzles includes a first set of one or more smart nozzles mounted at a first end of the boom and a second set of one or more smart nozzles mounted at a second, opposite end of the boom, wherein dynamically determining the base frequency includes, during a common time, determining a first frequency for the first set of one or more smart nozzles and a second frequency for the second set of one or more smart nozzles, the second frequency being different than the first frequency.

33. The method of claim 32, wherein the plurality of spray nozzles includes a third set of one or more smart nozzles mounted at a middle location of the boom between the first and second sets of one or more smart nozzles, wherein dynamically determining the base frequency includes, during the common time, determining a third frequency for the third set of one or more smart nozzles, the third frequency being between the second frequency and the first frequency.

34. The method of claim 18, wherein dynamically determining the phase offset includes determining one or more component phase offsets, the phase offset being based on the one or more component phase offsets.

35. The method of claim 18, further including determining a duty cycle for the spray nozzle based on a speed value associated with the spray nozzle.

36. The method of claim 35, wherein the duty cycle is an applied duty cycle based on a specified duty cycle.

* * * * *